(12) United States Patent
Clarke et al.

(10) Patent No.: US 11,280,455 B2
(45) Date of Patent: *Mar. 22, 2022

(54) MULTIFUNCTION FLEXIBLE LED FLASHLIGHT

(71) Applicant: Schumacher Electric Corporation, Mt. Prospect, IL (US)

(72) Inventors: Patrick J. Clarke, St. Charles, IL (US); John S. Whiting, Hampshire, IL (US)

(73) Assignee: Schumacher Electric Corporation, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,532

(22) Filed: Jun. 22, 2020

(65) Prior Publication Data

US 2020/0318800 A1    Oct. 8, 2020

Related U.S. Application Data

(63) Continuation of application No. 16/029,001, filed on Jul. 6, 2018, now Pat. No. 10,690,300.

(Continued)

(51) Int. Cl.
*F21L 4/02*     (2006.01)
*F21L 4/08*     (2006.01)
(Continued)

(52) U.S. Cl.
CPC .......... *F21L 4/027* (2013.01); *F02N 11/0862* (2013.01); *F02N 11/12* (2013.01);
(Continued)

(58) Field of Classification Search
CPC .......... F21L 4/08; F21V 29/89; F21V 29/773; F21V 21/406; F21V 21/145; F21V 23/0414; F21V 31/00; F21K 9/64; F21Y 2115/10
See application file for complete search history.

(56) References Cited

U.S. PATENT DOCUMENTS

| 2,648,762 | A | ‡ | 8/1953 | Dunkelberger | ......... F21L 15/06 362/19 |
| 3,037,137 | A | ‡ | 5/1962 | Motson | .................. H05B 33/20 313/50 |

(Continued)

FOREIGN PATENT DOCUMENTS

| CN | 205921410 U | 2/2017 |
| EP | 3026780 A1  | 6/2016 |

(Continued)

OTHER PUBLICATIONS

NEBO Twyst #6372 Web Page.‡

(Continued)

*Primary Examiner* — Tracie Y Green
(74) *Attorney, Agent, or Firm* — Michael Stanley Tomsa; McAndrews, Held & Malloy, Ltd.

(57) ABSTRACT

A flashlight having a housing, a light-end assembly, and a user interface. The light-end assembly, which may be coupled to an end of the housing, may comprise a flexible light component having a proximal end and a distal end. A first plurality of light emitting diodes (LEDs) may be distributed on the first flexible light component between the proximal end and the distal end. The flexible light component may include a flexible, semi-rigid structure to maintain the flexible light component in a desired shape or position.

20 Claims, 18 Drawing Sheets

Related U.S. Application Data

(60) Provisional application No. 62/529,258, filed on Jul. 6, 2017.

(51) Int. Cl.

| | | |
|---|---|---|
| *F02N 11/08* | (2006.01) | |
| *F21V 14/02* | (2006.01) | |
| *H02J 50/00* | (2016.01) | |
| *F21V 15/01* | (2006.01) | |
| *F02N 11/12* | (2006.01) | |
| *H02J 7/00* | (2006.01) | |
| *F21V 23/04* | (2006.01) | |
| *F21V 21/088* | (2006.01) | |
| *F21V 21/08* | (2006.01) | |
| *F21V 21/096* | (2006.01) | |
| *F21V 21/092* | (2006.01) | |
| *F21Y 103/10* | (2016.01) | |
| *F21Y 115/10* | (2016.01) | |
| *F02N 11/14* | (2006.01) | |
| *F21Y 107/40* | (2016.01) | |

(52) U.S. Cl.
CPC ............ *F21L 4/085* (2013.01); *F21V 14/025* (2013.01); *F21V 15/012* (2013.01); *H02J 7/00* (2013.01); *H02J 50/00* (2016.02); *F02N 11/14* (2013.01); *F21V 21/08* (2013.01); *F21V 21/0885* (2013.01); *F21V 21/0925* (2013.01); *F21V 21/0965* (2013.01); *F21V 23/0428* (2013.01); *F21Y 2103/10* (2016.08); *F21Y 2107/40* (2016.08); *F21Y 2115/10* (2016.08)

(56) References Cited

U.S. PATENT DOCUMENTS

| | | | | |
|---|---|---|---|---|
| 4,495,550 A ‡ | 1/1985 | Visciano | ............... | F21L 4/06 362/18 |
| 4,839,599 A ‡ | 6/1989 | Fischer | ............... | G01R 31/60 324/54 |
| 5,081,568 A | 1/1992 | Dong et al. | | |
| D366,707 S ‡ | 1/1996 | Kaiser | ............... | D26/43 |
| 5,521,803 A ‡ | 5/1996 | Eckert | ............... | F21V 21/145 362/19 |
| 5,653,529 A | 8/1997 | Spocharski | | |
| 5,707,137 A ‡ | 1/1998 | Hon | ............... | F21L 4/04 362/18 |
| 5,716,121 A ‡ | 2/1998 | Dubois | ............... | F21L 15/08 362/198 |
| 6,004,004 A ‡ | 12/1999 | Altman | ............... | F21V 21/32 362/18 |
| 6,265,984 B1 | 7/2001 | Molinaroli | | |
| 6,280,050 B1 ‡ | 8/2001 | Bird | ............... | F21V 21/32 362/19 |
| 6,371,637 B1 ‡ | 4/2002 | Atchinson | ............... | F21V 19/005 362/249.04 |
| 6,394,623 B1 ‡ | 5/2002 | Tsui | ............... | F21S 4/26 362/23 |
| 6,406,166 B1 ‡ | 6/2002 | Ko | ............... | F21S 4/26 315/18 |
| 6,457,841 B1 ‡ | 10/2002 | Lynch | ............... | F21L 4/045 362/19 |
| 6,604,841 B2 ‡ | 8/2003 | Liu | ............... | F21S 4/26 362/22 |
| 6,819,080 B2 ‡ | 11/2004 | Barbeau | ............... | F21L 2/00 320/107 |
| 6,874,908 B2 ‡ | 4/2005 | Sharrah | ............... | F21L 4/027 362/11 |
| 7,021,792 B2 ‡ | 4/2006 | Lin | ............... | F21S 4/26 362/21 |
| 7,347,606 B1 ‡ | 3/2008 | Patten | ............... | F21V 15/013 362/15 |
| 7,782,223 B2 ‡ | 8/2010 | Lang | ............... | B60Q 7/00 320/107 |
| 8,360,596 B2 ‡ | 1/2013 | Bertken | ............... | F21L 4/022 362/18 |
| 8,545,040 B2 ‡ | 10/2013 | Berken | ............... | F21V 33/00 362/18 |
| 9,080,734 B2 ‡ | 7/2015 | Andersen | ............... | F21L 4/00 |
| 9,228,704 B2 ‡ | 1/2016 | Andersen | ............... | F21L 4/00 |
| 9,303,832 B2 ‡ | 4/2016 | Sun | ............... | F21L 4/04 |
| 9,397,513 B2 ‡ | 7/2016 | Butler | ............... | H02J 7/0068 |
| 9,713,216 B2 ‡ | 7/2017 | Urry | ............... | H05B 33/0845 |
| 10,690,300 B2 * | 6/2020 | Whiting | ............... | F02N 11/0862 |
| 2003/0214809 A1 ‡ | 11/2003 | Wong | ............... | F21S 4/26 362/24 |
| 2004/0174703 A1 ‡ | 9/2004 | Tally | ............... | F21L 4/06 362/20 |
| 2005/0044703 A1 ‡ | 3/2005 | Liu | ............... | F21S 4/26 29/876 |
| 2007/0171082 A1 | 7/2007 | Melnik | | |
| 2008/0143275 A1 ‡ | 6/2008 | Hoffman | ............... | F21L 4/027 315/309 |
| 2009/0096413 A1 ‡ | 4/2009 | Partovi | ............... | H01F 5/003 320/108 |
| 2009/0279289 A1 ‡ | 11/2009 | Henry | ............... | F21L 4/04 362/19 |
| 2009/0290335 A1 | 11/2009 | Levine | | |
| 2011/0012518 A1 ‡ | 1/2011 | Tarter | ............... | F21L 2/00 315/16 |
| 2012/0020063 A1 ‡ | 1/2012 | Mironichev | ............ | F21L 4/025 362/191 |
| 2014/0268740 A1 ‡ | 9/2014 | Veres | ............... | H01L 33/54 362/235 |
| 2014/0328054 A1 * | 11/2014 | Andersen | ........... | H01R 13/6205 362/202 |
| 2015/0038165 A1 ‡ | 2/2015 | Tuo et al. | ............. | H05B 47/19 455/45 |
| 2015/0054336 A1 | 2/2015 | Xinfang | | |
| 2015/0300581 A1 * | 10/2015 | Huang | ............... | F21V 33/0056 362/86 |
| 2016/0351619 A1 ‡ | 12/2016 | Cramer | ............... | H01L 27/153 |
| 2016/0377243 A1 ‡ | 12/2016 | Mercer | ............... | F21L 4/04 362/183 |
| 2017/0299130 A1 ‡ | 10/2017 | Li | ............... | F21L 4/085 |
| 2017/0373539 A1 ‡ | 12/2017 | Von Novak, III | ...... | H02J 50/80 |
| 2018/0067384 A1 * | 3/2018 | Chien | ............... | F21S 10/002 |
| 2018/0163935 A1 ‡ | 6/2018 | Fowkes | ............... | F21L 4/045 |

FOREIGN PATENT DOCUMENTS

| | | | |
|---|---|---|---|
| WO | 2014189247 A1 | 11/2014 | |
| WO | WO2014189247 A1 ‡ | 11/2014 | ............... F21L 4/02 |

OTHER PUBLICATIONS

NEBO Slyde #6267 User Manual.‡
NEBO Cryket #6437 User Manual.‡
International Search Report for International Application No. PCT/US2018/041071 dated Nov. 13, 2018 (22 pages).‡
The extended European search report for European application No. 18829047.2, dated Mar. 1, 2021 European Patent Office, Germany (8 pages).

\* cited by examiner
‡ imported from a related application

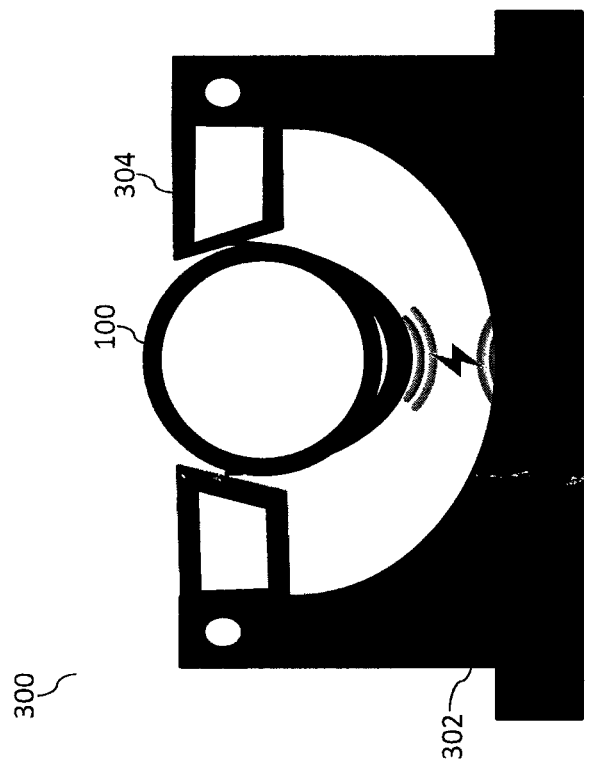
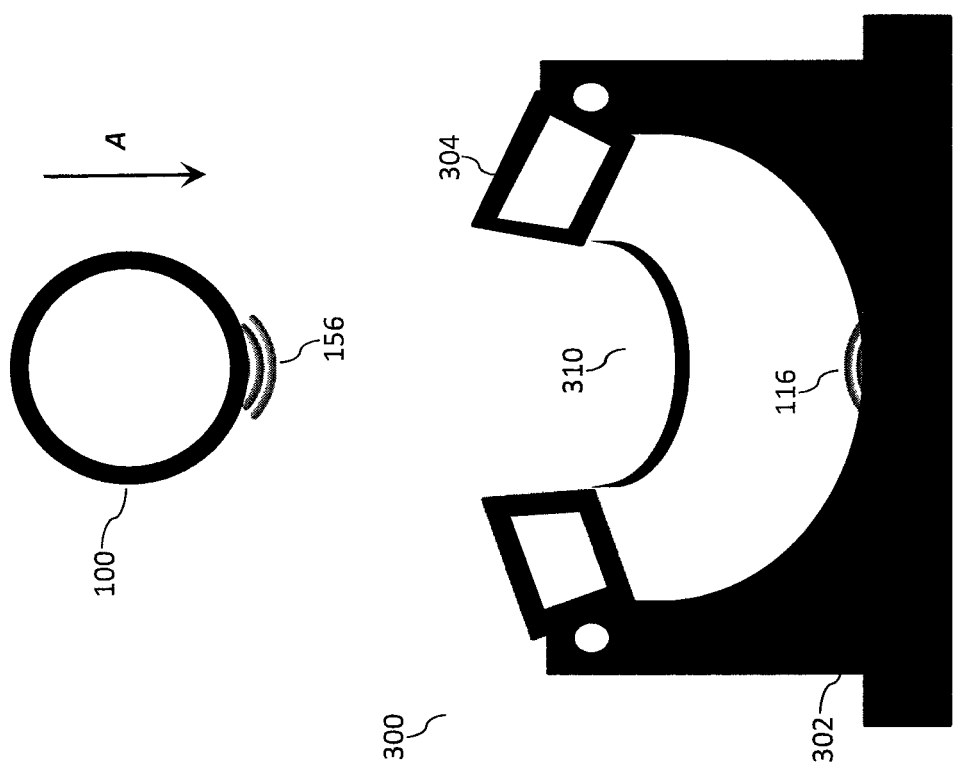
Figure 3b
Figure 3a

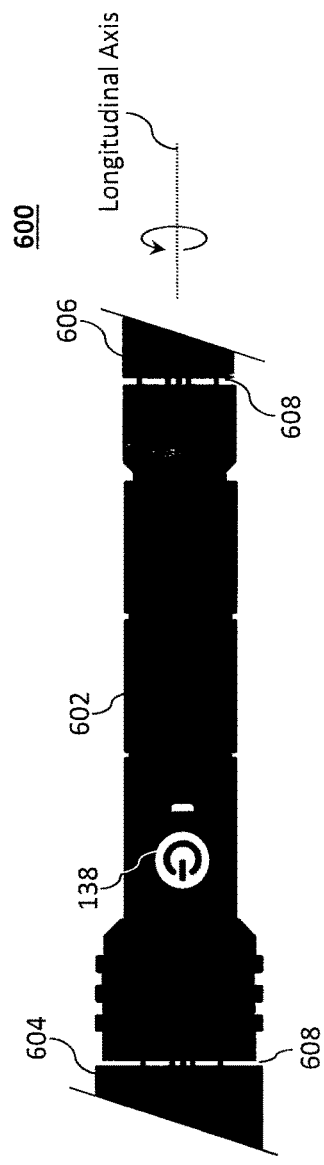
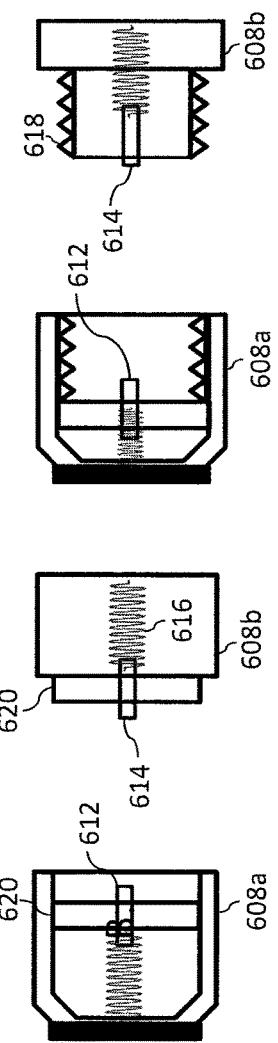
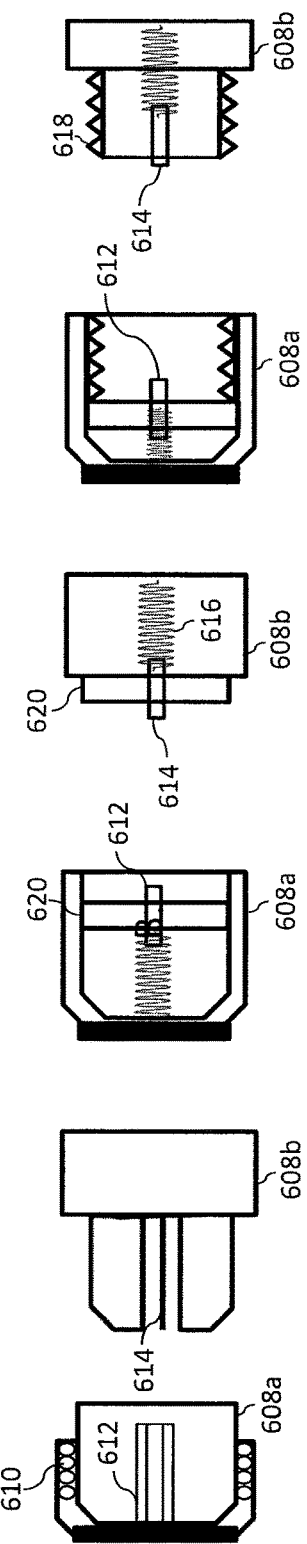
Figure 6a
Figure 6b
Figure 6c
Figure 6d

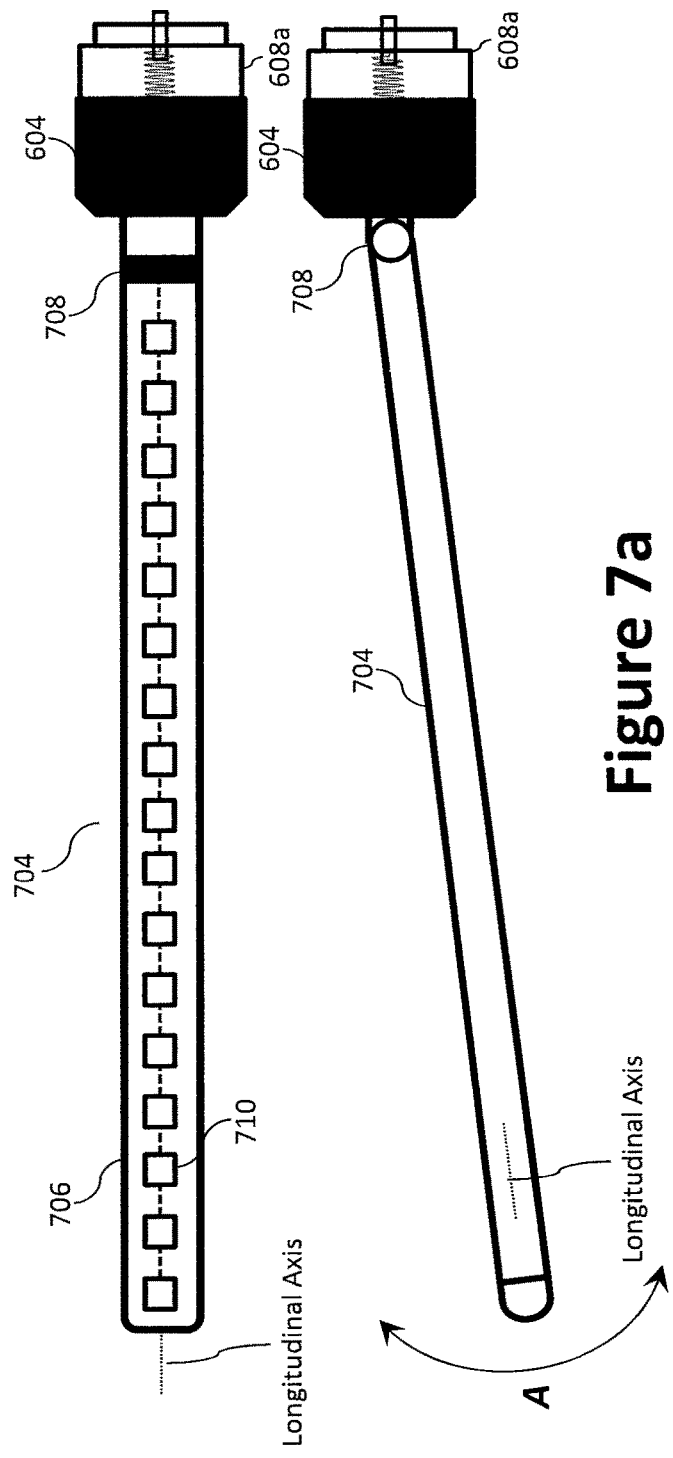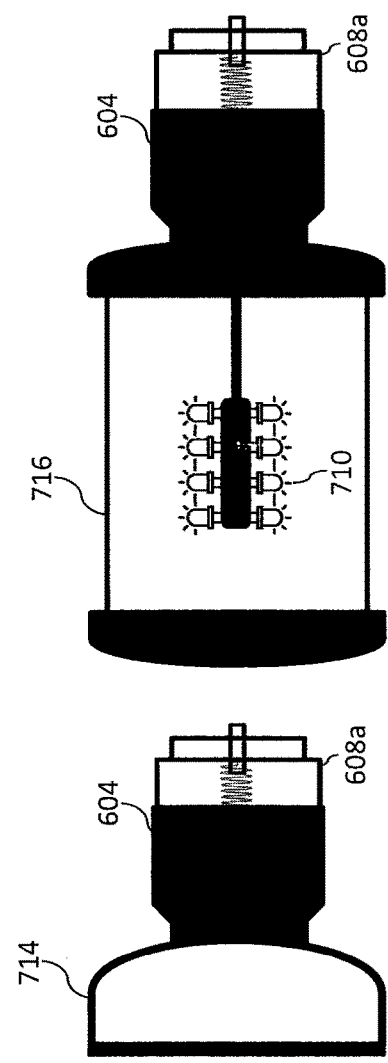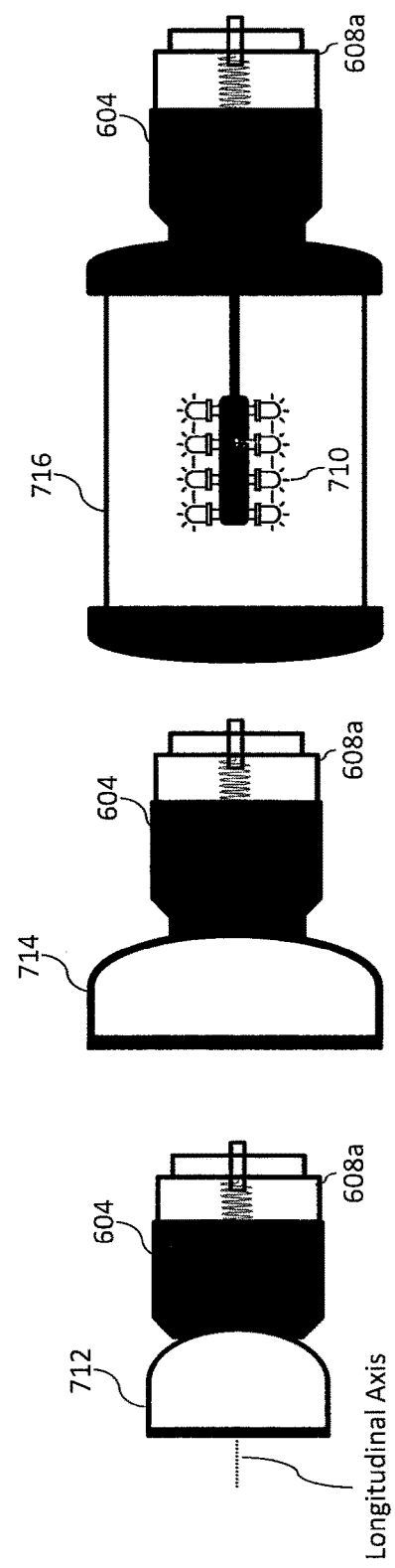

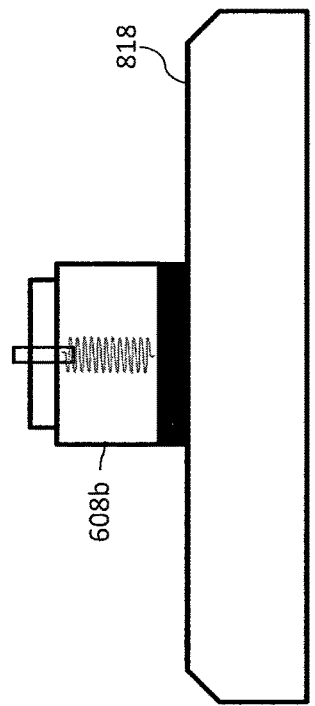
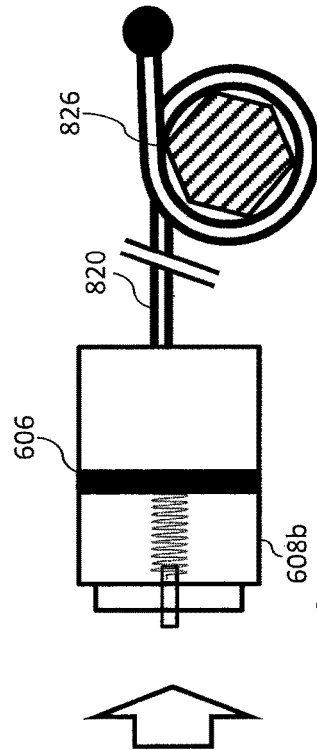
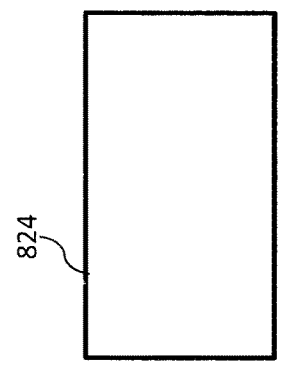
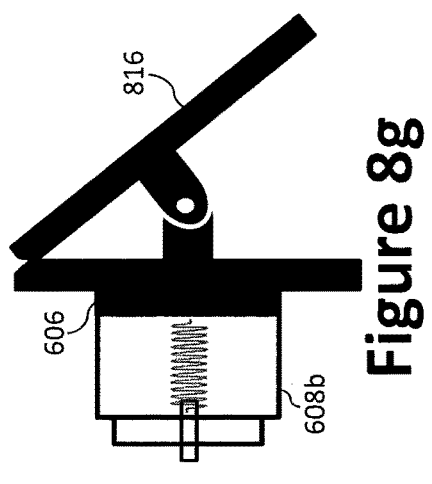
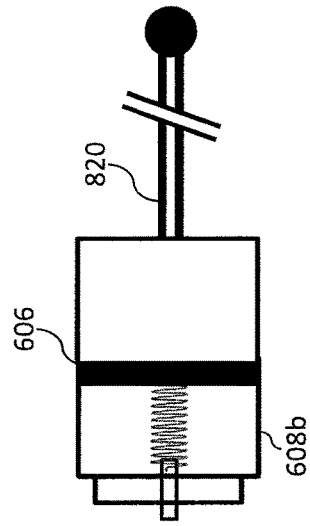
Figure 8g
Figure 8h
Figure 8i
Figure 8j

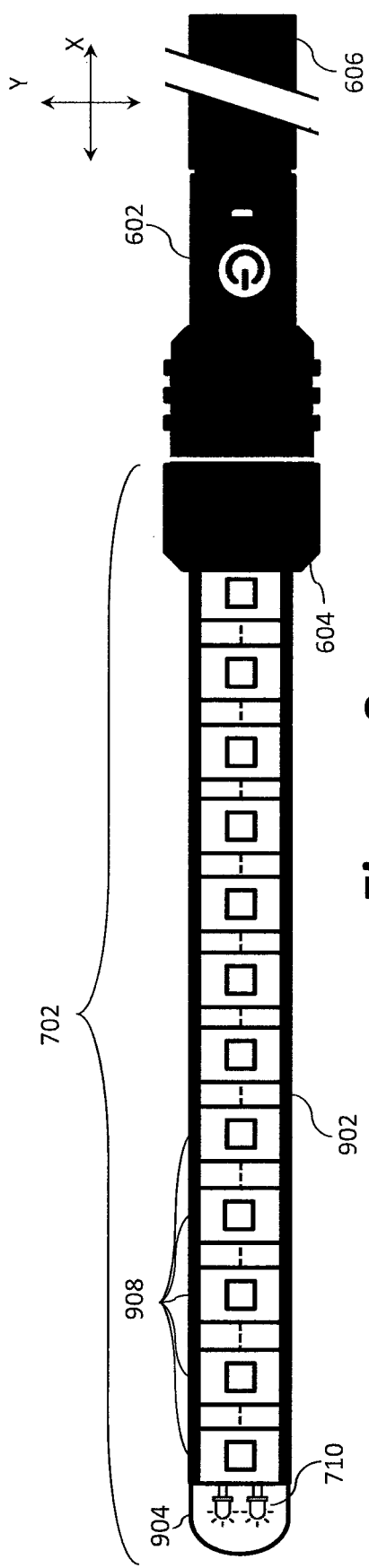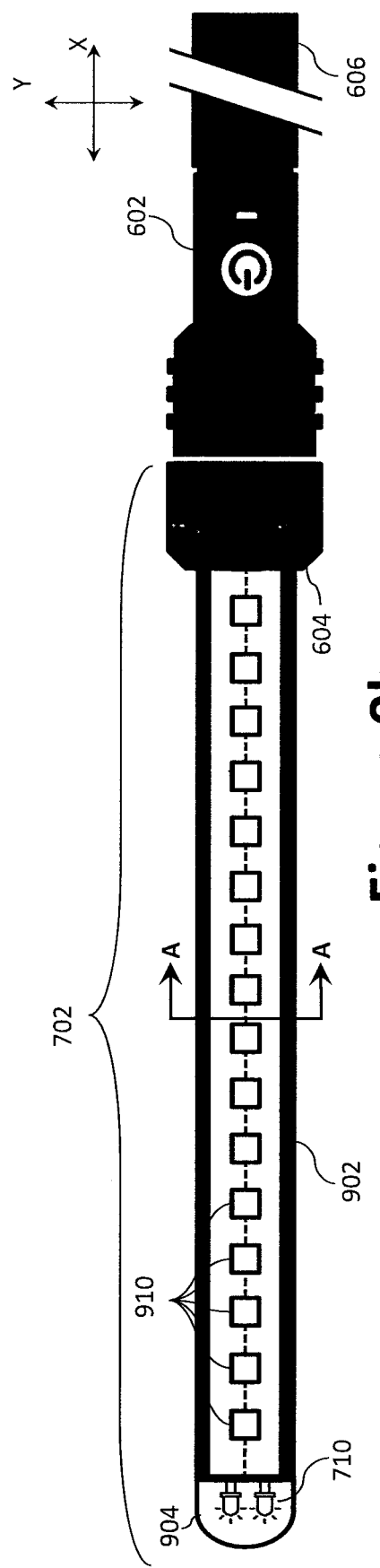

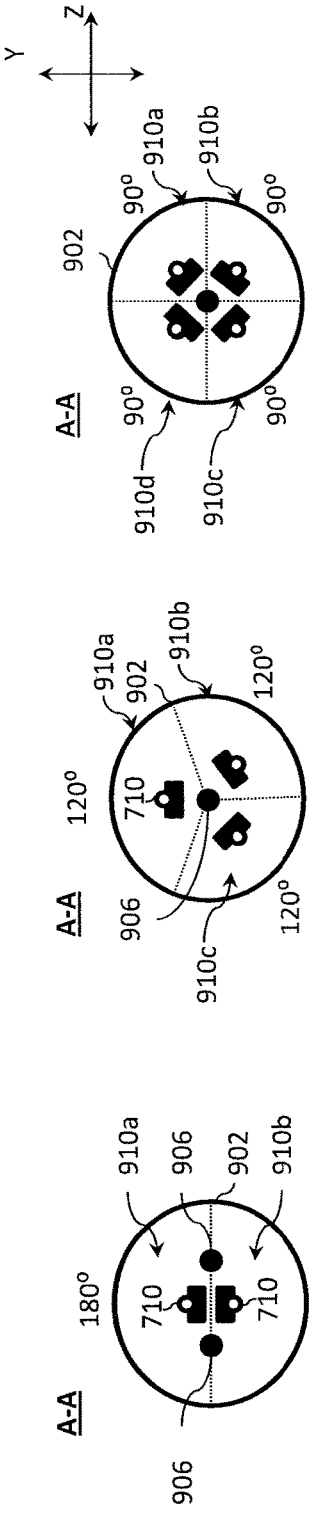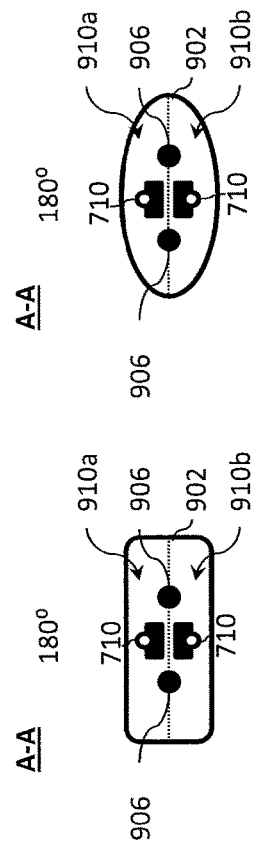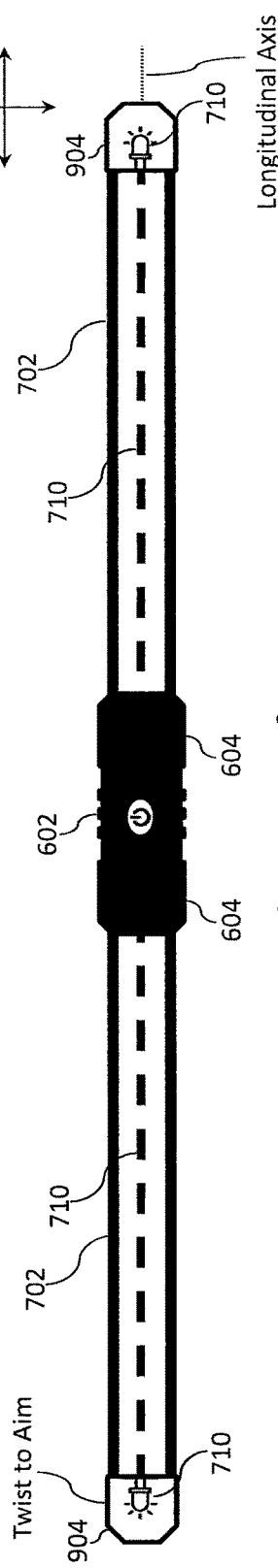

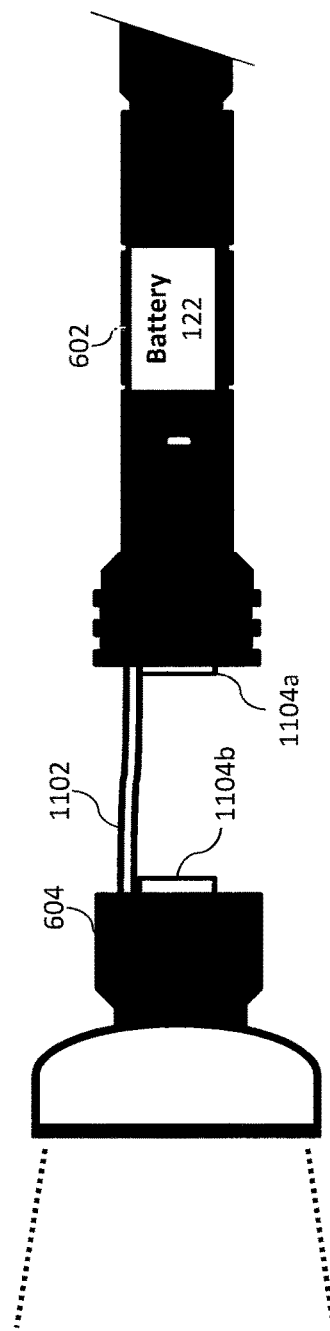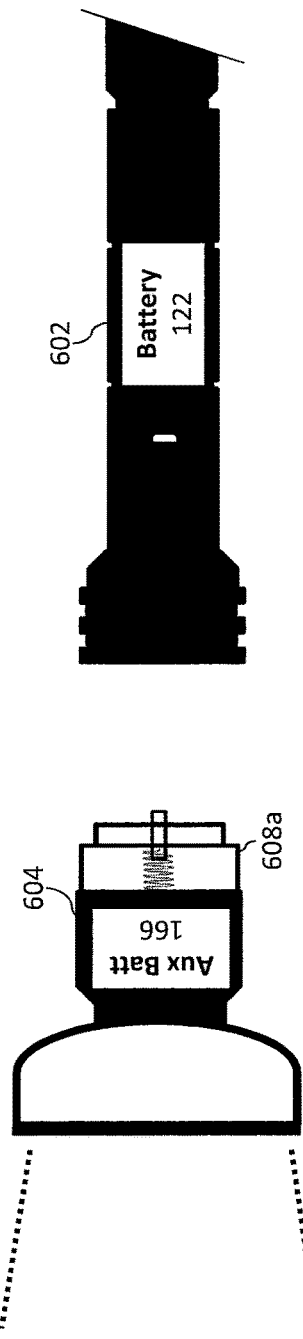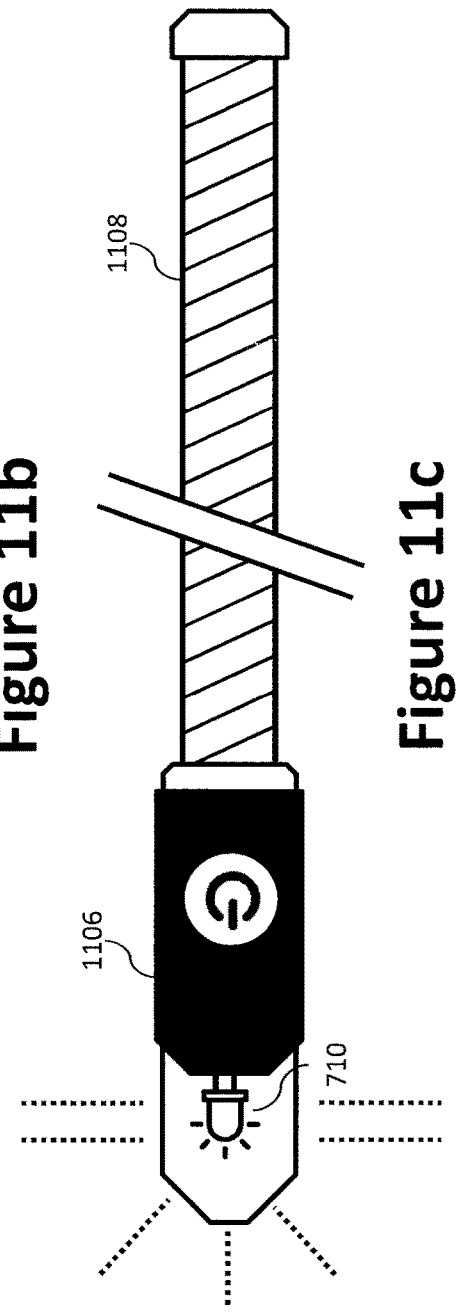
Figure 11a
Figure 11b
Figure 11c

MULTIFUNCTION FLEXIBLE LED FLASHLIGHT

CROSS-REFERENCE

The present application is a continuation of patent application Ser. No. 16/029,001, filed Jul. 6, 2018 and titled "Multifunction Flexible LED Flashlight," which claims the benefit under 35 U.S.C. § 119(e) of U.S. Provisional Patent Application No. 62/529,258, filed Jul. 6, 2017, and titled "Flash Light," the contents of which are hereby incorporated by reference.

TECHNICAL FIELD

The present disclosure relates to flashlights and portable lights. More specifically, the present disclosure relates to systems, methods, and apparatuses for remotely monitoring and/or controlling a flashlight, lamp, or other lighting device. The present disclosure also relates to modular flashlights with flexible lighting elements.

BACKGROUND

Various types of flashlights are known in the art. In one example, a flashlight may be a portable hand-held electric light, where the source of the light is an incandescent light bulb or light-emitting diode (LED). Generally, a flashlight comprises a light source (often mounted in a reflector), a transparent cover (sometimes combined with a lens) to protect the light source, a battery, and a switch/button to activate the light source. When working in poorly lit spaces, it is often advantageous to secure the flashlight to, or near, the workpiece to better-illuminate the area. For example, with regard to automotive repair, the flashlight may be secured adjacent the engine bay. As can be appreciated, the engine bay is typically crowded and, therefore, difficult to illuminate in its entirety.

Therefore, a need exists for a flashlight configured to project light toward generally inaccessible areas, while also generally illuminating the surrounding area. Existing adjustable flashlights include two categories: (1) those that are semi adjustable; and (2) those that are fully adjustable. Semi adjustable flashlights include a fixed light source having a swivel or pivot to achieve a greater field of view. An example semi adjustable flashlight is described by U.S. Pat. No. 6,457,841 to Peter F. Lynch et al., which is titled "Flashlight Having a Pivoting Head." Fully adjustable flashlights employ a single light source coupled to a flexible lead to enable the single light source to be targeted toward the workpiece. An example fully adjustable flashlight is described by U.S. Patent Pub. No. 2004/0174703A1 to Kevin Tally, which is titled "Flexible Flashlight with LED Light Source" ("703 publication"). The 703 publication generally describes a flashlight that includes a light source positioned at the end of a flexible two-lead wire. The 703 publication explains that the flexible wire may be bent to a desired configuration so as to enable the light source to be positioned in a desired, highly-inaccessible place.

Existing semi adjustable and fully adjustable flashlights suffer from certain problems. For example, the swiveling (or pivoting) joints of a semi adjustable flashlight limit the field of view of the light source to the mechanical limits of the movable joint, which results in dead zones (dark areas) where no light can be projected. Further, existing fully adjustable flashlights, such as the flashlight disclosed by the 703 publication, employs only a single light source at the distal end of the flexible wire. Therefore, while such an arrangement enables a user to direct light toward a specific area, the light coverage is limited to the single light source at the tip. As with the semi adjustable flashlights, this arrangement also results in dead zones. Thus, a need exists for a flexible flashlight that allows for illumination along the portion extending from housing to the tip of the light element, while also maintaining flexibility and directionality. A need also exists for modular flashlights that enable users to interchange components of the flashlight, as well as systems, methods, and apparatuses for remotely monitoring or controlling a flashlight and other lighting devices.

SUMMARY

The present disclosure is directed to modular flashlights, flashlights with flexible lighting, and to systems, methods, and apparatuses for remotely monitoring or controlling a flashlight and other lighting devices.

According to a first aspect, a flexible flashlight comprises: a housing having a proximal end and a distal end, wherein the housing defines a hollow cavity to house a battery; a light-end assembly having a flexible light component and a plurality of light emitting diodes, wherein the light-end assembly is coupled to the distal end of the housing, wherein the flexible light component has a proximal end and a distal end, the proximal end of the flexible light component being coupled with the light-end assembly, and wherein the plurality of light emitting diodes (LEDs) distributed along the flexible light component between its proximal end and its distal end; and a user interface positioned on an external surface of the housing, the user interface being configured to control a function of the flexible flashlight.

In certain aspects, the light-end assembly is configured to couple detachably with the distal end of the housing via a detachable connector.

In certain aspects, the detachable connector is a magnetic connector, a threaded connector, or a spring-tension quick disconnector.

In certain aspects, at least one of said plurality of LEDs is a surface mounted light emitting diode electrically mounted to a flexible printed circuit board (PCB).

In certain aspects, the flexible light component includes a flexible, semi-rigid structure to maintain the flexible light component in a desired shape or position.

In certain aspects, the flexible, semi-rigid structure is a metal wire.

In certain aspects, the battery is a rechargeable battery and said flexible flashlight comprises a charging circuit to charge said rechargeable battery.

In certain aspects, the charging circuit is coupled to a wireless receiver circuit configured to charge said rechargeable battery wirelessly using power received from an external wireless transmitter.

In certain aspects the flexible flashlight further comprises a drive circuit to adjust a brightness of the plurality of LEDs.

In certain aspects, the drive circuit employs a pulse width modulator to adjust the brightness of the plurality of LEDs.

In certain aspects, the flexible flashlight further comprises a base-end assembly coupled to the proximal end of the housing.

In certain aspects, the base-end assembly is configured to couple detachably with the proximal end of the housing via a detachable connector.

In certain aspects, the detachable connector is a magnetic connector, a threaded connector, or a spring-tension quick disconnector.

In certain aspects, the base-end assembly includes an auxiliary battery to charge the battery or power the flexible flashlight.

In certain aspects, the base-end assembly includes a hook or a magnet.

In certain aspects, the base-end assembly includes a suction cup module controlled by a switch or lever.

In certain aspects, the suction cup module is controlled by a switch or lever.

In certain aspects, the base-end assembly includes a swivel joint.

In certain aspects, the base-end assembly includes a clamp.

In certain aspects, the base-end assembly includes a base structure to support the housing in an upright position.

In certain aspects, the base-end assembly includes a USB power adapter to facilitate charging of an external device using the battery.

In certain aspects, the base-end assembly includes a tail attachment having (1) a flexible, semi-rigid core coated with flexible material or (2) a spring-metal core coated with flexible material.

In certain aspects, the base-end assembly includes a mouthpiece comprising a soft material configured to be comfortably secured or held by a user's mouth.

In certain aspects, the battery is a lithium ion battery.

In certain aspects, the battery is removable from the hollow cavity.

In certain aspects, the light-end assembly comprises an auxiliary battery to power the plurality of LEDs when the light-end assembly is detached from the housing.

In certain aspects, the battery is configured to charge the auxiliary battery when the light-end assembly is attached to the housing.

In certain aspects, the light-end assembly is coupled to the housing via a wired tether that is configured to power the plurality of LEDs using the battery when the light-end assembly is detached from the housing.

In certain aspects, the plurality of LEDs comprises a first LED that is configured to be controlled independently of a second LED.

In certain aspects, the first LED and the second LED are positioned to direct light in opposite directions of one another.

In certain aspects, the flexible light component has a substantially circular cross-section.

In certain aspects, the flexible light component has a substantially oval cross-section.

In certain aspects, the flexible light component has a substantially rectangular cross-section.

In certain aspects, the plurality of LEDs is divided into a plurality of LED arrays that can be independently activated or deactivated.

In certain aspects, the user interface is configured to adjust a desired amount of light around a longitudinal axis defined by the flexible light component by selectively activating one or more of the plurality of LED arrays.

In certain aspects, the user interface has a first extreme position and a second extreme position, wherein each of the plurality of LED arrays is deactivated when the user interface is in the first extreme position and each of the plurality of LED arrays is activated when the user interface is in the second extreme position.

In certain aspects, the user interface is configured to activate or deactivate the plurality of LED arrays incrementally as the user interface transitions between the first extreme position and the second extreme position.

In certain aspects, the flexible light component is configured to generate up to 360 degrees of light about the longitudinal axis.

According to a second aspect, a flashlight comprises: a housing having a proximal end and a distal end, wherein the housing defines a hollow cavity to house a battery; a light-end assembly having at least one light emitting diode (LED), wherein the light-end assembly is configured to couple detachably with the distal end of the housing via a detachable connector; an auxiliary battery situated in or on the light-end assembly, the auxiliary battery being configured to power the at least one LED when the light-end assembly is detached from the housing, wherein the battery is configured to charge the auxiliary battery when the light-end assembly is attached to the housing; and a user interface positioned on an external surface of the housing, the user interface being configured to control a function of the flashlight.

In certain aspects, the detachable connector is a magnetic connector, a threaded connector, or a spring-tension quick disconnector.

In certain aspects, the at least one LED is a surface mounted light emitting diode electrically mounted to a flexible printed circuit board (PCB).

In certain aspects, the battery is a rechargeable battery and said flashlight comprises a charging circuit to charge said rechargeable battery.

In certain aspects, the charging circuit is coupled to a wireless receiver circuit configured to charge said rechargeable battery wirelessly using power received from an external wireless transmitter.

In certain aspects, the flashlight further comprises a drive circuit to adjust a brightness of the plurality of LEDs.

In certain aspects, the drive circuit employs a pulse width modulator to adjust the brightness of the plurality of LEDs.

In certain aspects, the flashlight further comprises a base-end assembly coupled to the proximal end of the housing.

In certain aspects, the base-end assembly is configured to couple detachably with the proximal end of the housing via a detachable connector.

In certain aspects, the detachable connector is a magnetic connector, a threaded connector, or a spring-tension quick disconnector.

In certain aspects, the base-end assembly includes an auxiliary battery to charge the battery or power the flashlight.

In certain aspects, the base-end assembly includes a hook or a magnet.

In certain aspects, the base-end assembly includes a suction cup module.

In certain aspects, the flashlight further comprises a DC port to provide from the battery a jump starting current to jump start an engine of a vehicle.

In certain aspects, the base-end assembly includes a swivel joint.

In certain aspects, the base-end assembly includes a clamp.

In certain aspects, the base-end assembly includes a base structure to support the housing in an upright position.

In certain aspects, the base-end assembly includes a USB power adapter to facilitate charging of an external device using the battery.

In certain aspects, the base-end assembly includes a tail attachment having (1) a flexible, semi-rigid core coated with flexible material or (2) a spring-metal core coated with flexible material.

In certain aspects, the base-end assembly includes a mouthpiece comprising a soft material configured to be comfortably secured or held by a user's mouth.

In certain aspects, the battery is a lithium ion battery.

In certain aspects, the battery is removable from the hollow cavity.

According to a third aspect, a flexible flashlight comprises: a housing having a hollow cavity to house a battery, wherein the housing defines a first end and a second end that is opposed the first end, wherein the housing defines; a first light-end assembly coupled to the first end of the housing, wherein the first light-end assembly comprises (1) a first flexible light component having a proximal end and a distal end, and (2) a first plurality of light emitting diodes (LEDs) distributed on the first flexible light component between the proximal end and the distal end; a second light-end assembly coupled to the second end of the housing, wherein the second light-end assembly comprises (1) a second flexible light component having a proximal end and a distal end, and (2) a second plurality of light emitting diodes (LEDs) distributed on the second flexible light component between the proximal end and the distal end; and a user interface positioned on an external surface of the housing, the user interface being configured to control a function of the flexible flashlight.

In certain aspects, at least one of said first plurality of LEDs and at least one of said second plurality of LEDs is a surface mounted light emitting diode electrically mounted to a flexible printed circuit board (PCB).

In certain aspects, each of the first flexible light component and the second flexible light component includes a flexible, semi-rigid structure to maintain a desired shape or position.

In certain aspects, the flexible, semi-rigid structure is a metal wire.

In certain aspects, the battery is a rechargeable battery and said flexible flashlight comprises a charging circuit to charge said rechargeable battery.

In certain aspects, the charging circuit is coupled to a wireless receiver circuit configured to charge said rechargeable battery wirelessly using power received from an external wireless transmitter.

In certain aspects, the flexible flashlight further comprises a drive circuit to adjust a brightness of the first or second plurality of LEDs.

In certain aspects, the drive circuit employs a pulse width modulator to adjust the brightness of the first or second plurality of LEDs.

In certain aspects, the flexible flashlight further comprises a base-end assembly coupled to the proximal end of the housing.

In certain aspects, the base-end assembly is configured to couple detachably with the proximal end of the housing via a detachable connector.

In certain aspects, the detachable connector is a magnetic connector, a threaded connector, or a spring-tension quick disconnector.

In certain aspects, the base-end assembly includes an auxiliary battery to charge the battery or power the flexible flashlight.

In certain aspects, the base-end assembly includes a hook or a magnet.

In certain aspects, the base-end assembly includes a suction cup module.

In certain aspects, the suction cup module is controlled by a switch or lever.

In certain aspects, the base-end assembly includes a swivel joint.

In certain aspects, the base-end assembly includes a clamp.

In certain aspects, the base-end assembly includes a base structure to support the housing in an upright position.

In certain aspects, the base-end assembly includes a USB power adapter to facilitate charging of an external device using the battery.

In certain aspects, the base-end assembly includes a tail attachment having (1) a flexible, semi-rigid core coated with flexible material or (2) a spring-metal core coated with flexible material.

In certain aspects, the base-end assembly includes a mouthpiece comprising a soft material configured to be comfortably secured or held by a user's mouth.

In certain aspects, the battery is a lithium ion battery.

In certain aspects, the battery is removable from the hollow cavity.

In certain aspects, each of said first and second plurality of LEDs comprises a first LED that is configured to be controlled independently of a second LED.

In certain aspects, the first LED and the second LED are positioned to direct light in opposite directions of one another.

According to a fourth aspect, a flashlight comprises: a housing defining a hollow cavity to house a battery; a light-end assembly having at least one light emitting diode (LED), wherein the light-end assembly is coupled to the housing; a communication module operatively coupled with a processor, wherein the communication module is configured to communicate commands or data wirelessly between the flashlight and an external communication device; and a user interface positioned on an external surface of the housing, the user interface being configured to control a function of the flashlight.

In certain aspects, the external communication device is a smart phone or a tablet.

In certain aspects, the flashlight further comprises a global positioning system (GPS) transmitter or receiver to track or monitor a location of the flashlight dynamically, wherein the flashlight is configured to communicate the location of the flashlight to the external communication device via the communication module.

In certain aspects, the flashlight is configured to communicate the location of the flashlight to the external communication device in real-time or near real-time.

According to a fifth aspect, a flashlight comprises: a housing having a proximal end and a distal end, wherein the housing defines a hollow cavity to house a battery; a light-end assembly having a light component having a plurality of light emitting diodes (LEDs), wherein the plurality of LEDs is divided into a plurality of LED arrays that can be independently activated or deactivated, and wherein the plurality of LED arrays are arranged to direct light around and radially from an axis defined by the light component; and a user interface positioned on an external surface of the housing, wherein the user interface is configured to adjust a desired amount of light around the axis by selectively activating one or more of the plurality of LED arrays.

In certain aspects, the user interface has a first extreme position and a second extreme position, wherein each of the plurality of LED arrays is deactivated when the user interface is in the first extreme position and each of the plurality of LED arrays is activated when the user interface is in the second extreme position.

In certain aspects, the user interface is configured to activate or deactivate the plurality of LED arrays incrementally as the user interface transitions between the first extreme position and the second extreme position.

In certain aspects, the light component is configured to generate selectively between 0 and 360 degrees of light about the axis.

In certain aspects, the light component is a flexible linear shaft.

In certain aspects, the light component is a rigid linear shaft.

In certain aspects, the user interface is a knob or dial.

DESCRIPTION OF THE DRAWINGS

These and other advantages of the present disclosure will be readily understood with reference to the following specifications and attached drawings, wherein:

FIGS. 3a through 3d illustrate an exemplary wireless charging stations for use with a flashlight system.

FIGS. 6a through 6d illustrates an exemplary modular flashlight and various types of detachable connectors for use with a modular flashlight.

FIGS. 7a through 7e illustrate exemplary light-end assemblies and light-end configurations.

FIGS. 8a through 8j illustrate exemplary base-end assemblies and base-end configurations.

FIGS. 9a through 9g illustrate an exemplary flexible light component for use with the flashlight.

FIG. 9h illustrates an exemplary dual-headed flashlight having two flexible light components.

FIGS. 11a and 11b illustrate example powered detachable light-end assemblies for a flashlight.

FIG. 11c illustrates a flashlight having a compact light head be positioned at an end of a flexible structure.

DETAILED DESCRIPTION

Figure 1:
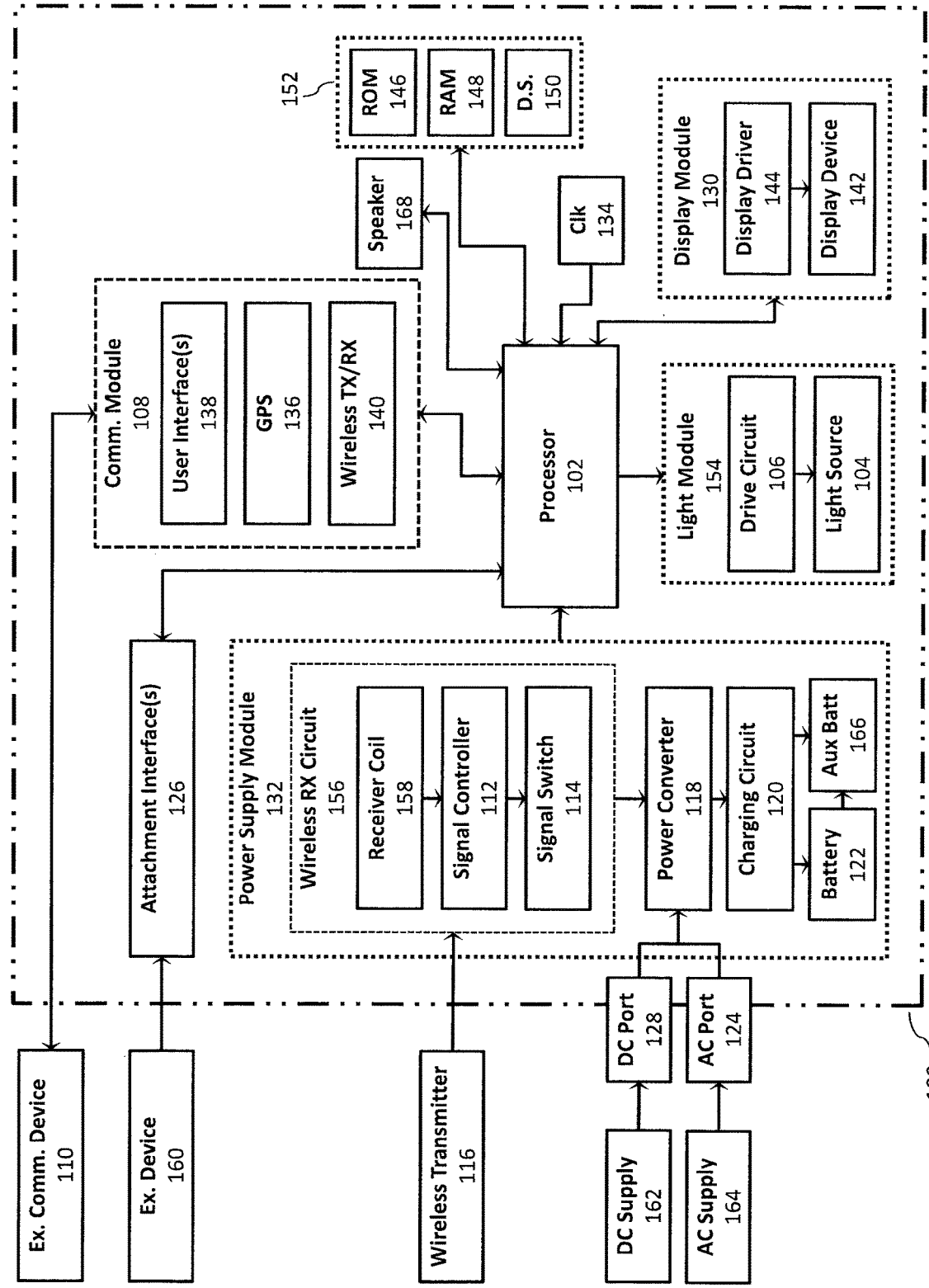
FIG. 1 illustrates a system diagram of an exemplary flashlight.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this disclosure, the following terms and definitions shall apply:

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of (i) a connection, whether direct or through one or more other devices, apparatuses, files, circuits, elements, functions, operations, processes, programs, media, components, networks, systems, subsystems, or means, (ii) a communications relationship, whether direct or through one or more other devices, apparatuses, files, circuits, elements, functions, operations, processes, programs, media, components, networks, systems, subsystems, or means, and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

FIG. 1 illustrates a functional diagram for an exemplary flashlight 100. As illustrated, the flashlight 100 may include a processor 102, a power supply module 132, and a light module 154. Where desired, the flashlight 100 may further include a display module 130, a communication module 108, a memory device 152, and one or more attachment interfaces 126. The memory device 152 may include read-only memory (ROM) 146 to receive one or more instruction sets, random access memory (RAM) 148 having a plurality of buffers for temporarily storing and retrieving information, and an internal data storage device 150, such as a hard drive, a solid state drive or other non-volatile data storage device. A clock 134 is also coupled to the processor 102 to provide clock, timing signals, and/or pulses thereto. The processor 102 may be operatively coupled to each of the power supply module 132, the light module 154, the display module 130, the communication module 108, the memory device 152, and the one or more attachment interfaces 126. The one or more attachment interfaces 126 may be used to communicatively couple and/or power various external devices 160 (e.g., those that may be removably coupled with the flashlight 100). The various external devices 160 may include, inter alia, a removable USB adapter, electro-magnet, auxiliary power supply, etc. The attachment interface(s) 126 may therefore act as the electrical interface between one or more external devices 160 and the processor 102 (and/or the power supply module 132) to control and/or power the various external devices 160.

Those skilled in the art will appreciated that the flashlight 100 includes one or more bus structures for interconnecting its various components. For example, the various modules and components thereof may communicate with one another through software and/or hardware interfaces, which may be hard wired and/or wireless. Further, the hardware interfaces may be removably coupled such that one module can be replaced or interchanged by the user. The various components of a flashlight 100 may be housed in a compact housing (or modular housing) to increase ease of use in mobile applications. The flashlight's 100 housing may be fabricated from a material that anti-corrosive and resistant to water, dust, and/or shock. To that end, the flashlight's 100 housing may be fabricated from one or more materials, including plastic, metal (e.g., anodized aluminum, stainless steel), composites, or hybrids thereof, such as rubber coated metal, rubber coated plastic, etc. For example, where the flashlight 100 serves as a tactical light, the flashlight's 100 housing may be fabricated from metal or another durable material.

Power Supply Module 132.

The power supply module 132 may include a power converter 118, a charging circuit 120, a battery 122, an auxiliary battery 166, and, where inductive charging is desired, a wireless receiver circuit 156. While power leads are not illustrated in FIG. 1, the power supply module 132 manages and controls the flow of electrical energy from a power supply (via the AC port 124, the DC port 128, and/or the wireless receiver circuit 156) to the various components of the flashlight 100.

The power converter 118 may receive one or more forms of electrical power (e.g., an electromagnetic field, radio frequency ("RF"), direct current ("DC"), or alternating current ("AC")) and to convert the received electrical power into a predetermined voltage and/or current. For example, the power converter 118 may be a DC-DC converter, an AC-DC converter, a RF-DC converter, etc. For example, in operation, the power converter 118 receives power from a power supply (e.g., the wireless transmitter 116, the external DC power supply 162, and/or the external AC power supply 164, such as 120 VAC line power, etc.) and converts it to a predetermined voltage and/or current, which is then passed to the charging circuit 120 to charge the battery 122 and/or, where desired, one or more auxiliary batteries 166. The auxiliary battery 166, which may be positioned in the housing or external to the housing, may also be charged by battery 122, for example, when power is not available from the power supply. In certain aspects, the power converter 118 and/or charging circuit 120 may be external to the flashlight's 100 housing (e.g., a wall-mounted AC/DC converter, colloquially known as a "wall-wart").

The charging circuit 120 may charge the battery 122 and/or auxiliary battery 166 using one or more charging protocols and/or by apply signal filtering to power received from the power converter 118. The charging circuit may be operatively coupled with at least one battery (e.g., battery 122, auxiliary battery 166, etc.) to store power needed to operate the flashlight 100. The charging circuit 120, in conjunction with the processor 102, may monitor the capacity and charge level (e.g., state of charge (SoC)) of the battery 122 (or auxiliary battery 166) and to determine safe charging thresholds. The charging circuit 120 may shut off the flow of electrical power when the charging circuit 120 detects that the battery 122 and/or or auxiliary battery 166 has reached a full SoC. In certain aspects, the charging circuit 120 may function as a switch to allow energy stored in the battery 122 to be discharged to the DC port 128 via the power converter 118, which can be used to charge or jump start an external device. For example, the DC port 128 may be a USB port configured to both receive power to charge the battery 122 and to output DC power from the battery 122 to charge an external device (e.g., a cellular phone, tablet, or other portable electronic) via the USB port. In another example, the battery 122 may be used to output a jump starting current to a vehicle. To that end, the battery 122 may be sized to produce a jump starting current to a vehicle's combustion engine. For example, the battery 122 may be rated from about 3,000 mah to 30,000 mah, or higher. A flashlight 100 having a 12,000 mah internal battery 122, for instance, may output 200 cranking amps/400 peak amps via a DC port (e.g., via an EC5 connector/connection) during a jump start function, which is sufficient to start a vehicle. Higher power internal batteries are contemplated for larger vehicles, trucks, and other vehicles with larger engines. Suitable battery boosting techniques are disclosed by commonly owned U.S. Pat. No. 9,397,513 by Brian F. Butler et al, filed Aug. 14, 2015 and titled "Compact Multifunctional Battery Booster."

The auxiliary battery 166 may be smaller than the battery 122 and used to power only portions (or subcomponents) of the flashlight 100. For example, as will be described below in connection with FIGS. 11a and 11b, the flashlight 100 may include a detachable light-end assembly that remains powered when detached from the housing. Accordingly, an auxiliary battery 166 may be integrated with the detachable light-end assembly to enable operation of the detachable light-end assembly, even when detached from the remainder of the flashlight 100; thereby enabling the detachable light-end assembly to generate light for a period of time using power stored to the auxiliary battery 166. As noted above, the auxiliary battery 166 may be charged by the battery 122 when the detachable light-end assembly is connected to the remainder of the flashlight 100.

The battery 122 and/or auxiliary battery 166 may be a rechargeable battery to store and output DC power, such as rechargeable lithium batteries, nickel metal hydride (NiMH) batteries, etc. Example rechargeable lithium batteries include, inter alia, lithium cobalt oxide, lithium manganese oxide, lithium iron phosphate, lithium nickel manganese cobalt oxide, lithium nickel cobalt aluminum oxide, and lithium titanate. The battery 122 and/or auxiliary battery 166 may be removable from the flashlight 100 to allow the user to quickly exchange or replace a depleted battery 122 with a fully charged battery 122, in which case a depleted battery 122 may be charged externally to the flashlight 100 via a wall charger or other external charger/charger station. This arrangement enables the user to charge the depleted battery 122 while another battery 122 is in use, thereby decreasing downtime.

Where a non-rechargeable battery (e.g., alkaline batteries) is used or desired, the flashlight 100 may permit usage of either rechargeable or non-rechargeable batteries. To that end, the processor 102 may first confirm that the battery 122 coupled to the flashlight 100 is a rechargeable battery prior to supplying a charging current, thereby mitigating the risk of fire by inadvertently supplying a charge current to a non-rechargeable battery. In one example, the flashlight 100 may employ smart rechargeable batteries with an inter-integrated circuit or 1-wire memory, where the battery 122 is treated as a non-rechargeable battery (i.e., no charge current will be supplied) if the inter-integrated circuit or 1-wire memory is not detected. In another example, the power supply module may include a circuit to distinguish rechargeable from non-rechargeable battery cells. For example, the charging circuit 120 may measure the internal impedance of the battery's 122 cells to differentiate between rechargeable (lower impedance) and non-rechargeable cells (higher impedance).

The power supply module 132 may include a wireless receiver circuit 156 to transfer energy in the form of an electromagnetic field from an external wireless transmitter 116 to the power converter 118. The wireless receiver circuit 156 may include a receiver coil 158 (or an antenna, where applicable), a signal controller 112, and a signal switch 114. The wireless receiver circuit 156 may receive one or more forms of wireless power, including near-field wireless power and far-field wireless power. The processor 102 may be configured to identify the wireless power transfer standard employed by the external wireless transmitter 116 to prevent the flashlight 100 from being damaged by an incompatible energy source. Example wireless power transfer standards include, inter alia, Wireless Power Consortium (Qi), Power Matters Alliance (PMA), Alliance for Wireless Power, and Federal Communication Commission regulations.

In certain aspects, the power supply module 132 may receive wireless power and an accompanying wireless power protocol handshake from the wireless transmitter 116, which may be passed to a signal controller 112. The signal controller 112 may be electrically coupled to the wireless transmitter 116 via a receiver coil 158. The signal controller 112 may receive the wireless power signal and prohibit (e.g., via signal switch 114) the power from entering the rest of the power supply module 132 until the signal controller 112 has determined whether the wireless power signal received is of a compatible wireless power transmission standard. To that end, the signal controller 112 may communicate with a signal switch 114 that can be selectively opened and closed to allow only compatible wireless power signals to be passed to a power converter 118.

Light Module 154.

The light module 154 generally comprises a drive circuit 106 that is operatively coupled with a light source 104. The drive circuit 106 may control and adjust the light emitted by the light source 104 based on commands from the processor 102 (or directly from the user interface 138). More specifically, the drive circuit 106 may adjust the brightness of the light source 104. For example, the drive circuit 106 may employ a pulse width modulator (PWM) to adjust the brightness of light emitted by the light source 104 (e.g., when light emitting diodes (LEDs) are used). The drive circuit 106 may use the PWM to achieve a desired brightness by selectively turning off and on the LEDs at a predetermined frequency or duty cycle. The LEDs may be provided as, for example, chip-on-board (COB) LEDs, surface mounted devices, PCB-mounted LEDs, etc. The brightness of the light source 104 may be adjusted using, for example, the user interface 138 (a dimmer switch/wheel positioned on the housing).

The light source 104 may employ one or more LEDs (e.g., an array of LEDs) to produce white light. LEDs may be used to produce white light using three individual LEDs that emit three primary colors (i.e., red, green, and blue), which are then mixed to form white light. Another method of forming white light is to coat the LEDs using a phosphor material. For example, a blue or UV LED may be coated with a phosphor material to convert monochromatic light to broad-spectrum white light. In certain aspects, the light source 104 may employ an ultraviolet (UV) light element (e.g., a UV LED) to track ultraviolet reactive fluids. As will be discussed with regard the modular flashlight illustrated in FIG. 6a, the light source 104 may be detachable from the housing (e.g., handle portion, base portion, etc.), thereby allowing the light source 104 to be quickly interchanged with another light source (e.g., a different type of light source).

The drive circuit 106 may be configured to drive (e.g., selectively activate) the light source 104 (or portion(s) thereof) in accordance with one or more user-selectable predetermined modes, including a flashing mode, an SOS mode, etc. In the flashing mode, the drive circuit 106 may flash the light source 104 at a predetermined frequency, which may be slow or rapid (e.g., to produce a strobing effect). In the SOS mode, the drive circuit 106 may flash the light source 104 in accordance with a specific pattern that corresponds to the Morse code equivalents to the characters "S"-"O"-"S." The processor 102 may also be configured to change to color of the light emitted by the light source 104 by selectively activating components of the light source 104. For example, the light source 104 may employ a plurality of light elements (e.g., individual bulbs or LEDs) of various colors or temperatures, where the processor 102 may instruct the drive circuit 106 to illuminate a particular group of light elements to yield a particular color, brightness, or temperature. For example, the light source 104 may be configured to generate light of different colors (e.g., red, green, blue, etc.) using the LEDs.

Display Module 130.

The display module 130 may be used to inform the user of the flashlight's 100 current status and/or mode of operation, as well as other information (e.g., battery life, brightness, color temperature, etc.). The display module 130 may comprise a display device 142 operatively coupled with a display driver 144, which is operatively coupled to the processor 102 (either directly as illustrated, or via the communication module 108). The display driver 144 may condition the data signals sent to the display device 142 from the processor 102 to generate a usable output that is compatible with the display device 142. In certain aspects, a speaker 168 may be added to produce an auditory tone to alert the user of the current status and/or mode. In certain aspects, the speaker 168 may be used for entertainment purposes by serving as a wireless speaker. For example, audio files from an external communication device 110 may be played via the speaker 168 and communication module 108 using, for example, Bluetooth communication or another wireless link.

The display device 142 may comprise one or more light emitting diodes (LEDs), a liquid crystal display (LCD) screen, a segmented display device, etc. For example, the display device 142 may be an alphanumeric segmented LED/LCD display or a matrix LCD display. The LED or LCD screen may receive information from the processor 102 to create a graphical interface which may display images to represent each status and/or mode. In certain aspects, the display device 142 may further provide touch screen functionality to facilitate a user input device via a thin layer of sensing circuitry present either beneath the visible portion of display device's 142 surface, or as part of a thin, clear membrane overlying the display device 142 that is sensitive to the position of a pen or finger on its surface.

Communication Module 108.

The communication module 108 may be configured to exchange commands and other data between the flashlight 100 and an external communication device 110 (e.g., computer, smart phone, tablet, PDA, etc.). The communication module 108 may include, inter alia, a wireless transceiver 140, global positioning system (GPS) transmitter 136, and a connection for other user interface(s) 138.

The user interface(s) 138 may enable the user to activate/deactivate the light source 104, switch the light source 104 between lighting modes, etc. Example user interface(s) 138 devices may include, for example, physical buttons, physical switches, a digitizer (whether a touch pad, or transparent layer overlaying the display device 142), and other input devices. For instance, using the digitizer, a user may control or interact with the flashlight 100 by writing, or tapping on the display device 142 using, a pen, stylus, or finger.

The GPS transmitter 136 may be used to dynamically track and/or monitor the location of the flashlight 100 (and its corresponding user) and to relay the location information in the form of positional data (e.g., geographic coordinate system data or Internet Protocol (IP) address) for display on the display device 142 or communicated to a remote computer via a communication network in real-time or near real-time. For example, in the case of an emergency, the flashlight's 100 positional data may be communicated over the communication network to emergency response personnel to assist in locating the user of the flashlight 100 (e.g., soldiers, firemen, law enforcement personnel, outdoorsmen, etc.). The positional data may also be locally logged and stored to the flashlight 100 (e.g., to internal data storage device 150) to facilitate tracking over a period of time. For example, the flashlight 100 may be used to confirm that a security guard, or other personnel, has completed/performed his or her rounds (e.g., checked the perimeter of the property in a regular or timely fashion).

The wireless transceiver 140 may manage communication and/or transmission of signals or data between the processor 102 and another device (e.g., an external communication device 110 via a communication network or directly with an external communication device 110). The wireless transceiver 140 may be configured to communicate via one or more wireless standards such as Bluetooth (e.g., short-wavelength, ultra-high frequency (UHF) radio waves in the industrial, scientific, and medical (ISM) band from 2.4 to 2.485 GHz), near-field communication (NFC), Wi-Fi (e.g., Institute of Electrical and Electronics Engineers' (IEEE) 802.11 standards), etc. For example, wireless connectivity (e.g., RF 900 MHz or Wi-Fi) may be built in to the flashlight 100 to provide remote monitoring and control the flashlight 100 via one or more external communication devices 110.

A user may, via a communication network 202, control and dynamically (e.g., in real-time or near real-time) monitor for live status updates, charging/battery status, lighting conditions, and historic data and/or remotely update software and firmware. In certain aspects, an internal cellular modem may be implemented that utilizes standards-based wireless technologies, such as 2G, 3G, code division multiple access (CDMA), orthogonal frequency-division multiplexing (OFDM), and Global System for Mobile Communications (GSM), to provide wireless data communication over worldwide cellular networks. An advantage of an internal cellular modem is that there is no reliance on a user's local network (e.g., wireless router, modem, etc.). For example, using said wireless transceiver 140, the flashlight 100 may download an entirely new lighting mode wirelessly. In operation, the flashlight 100 may first download the new lighting mode into a secondary memory (e.g., a flash memory chip) before verifying the data is correct in the secondary memory, then, ability at any point thereafter to upgrade it into main microprocessor, without requiring user consent. Indeed, it may be advantageous to force push/download certain updates to the flashlight 100 related to: reliability issues, safety, new battery charging profile, etc.

Figure 2A:
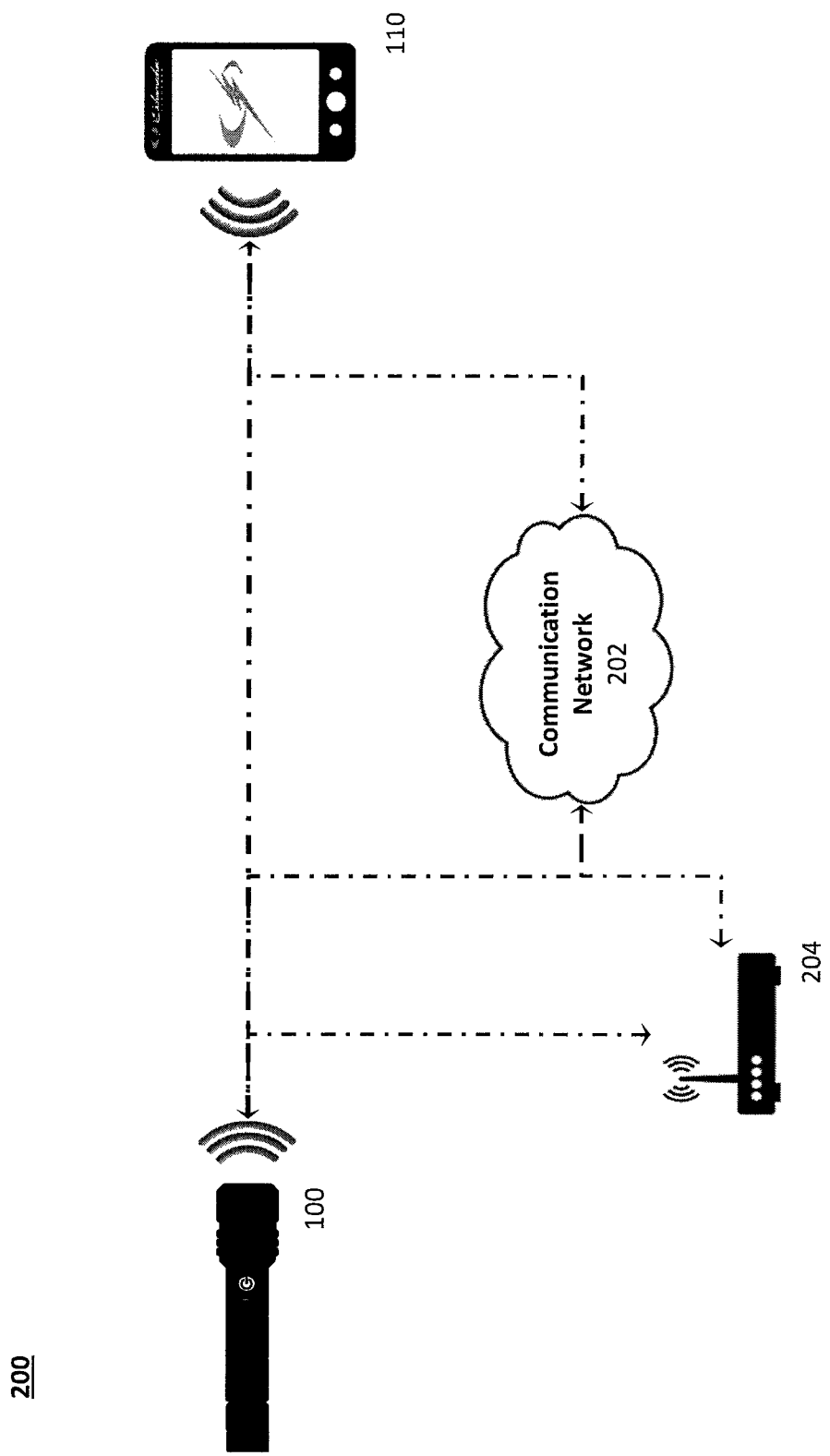
FIGS. 2a and 2b illustrate an exemplary flashlight communication network and external communication device to control and monitor a flashlight.
Figure 2B:
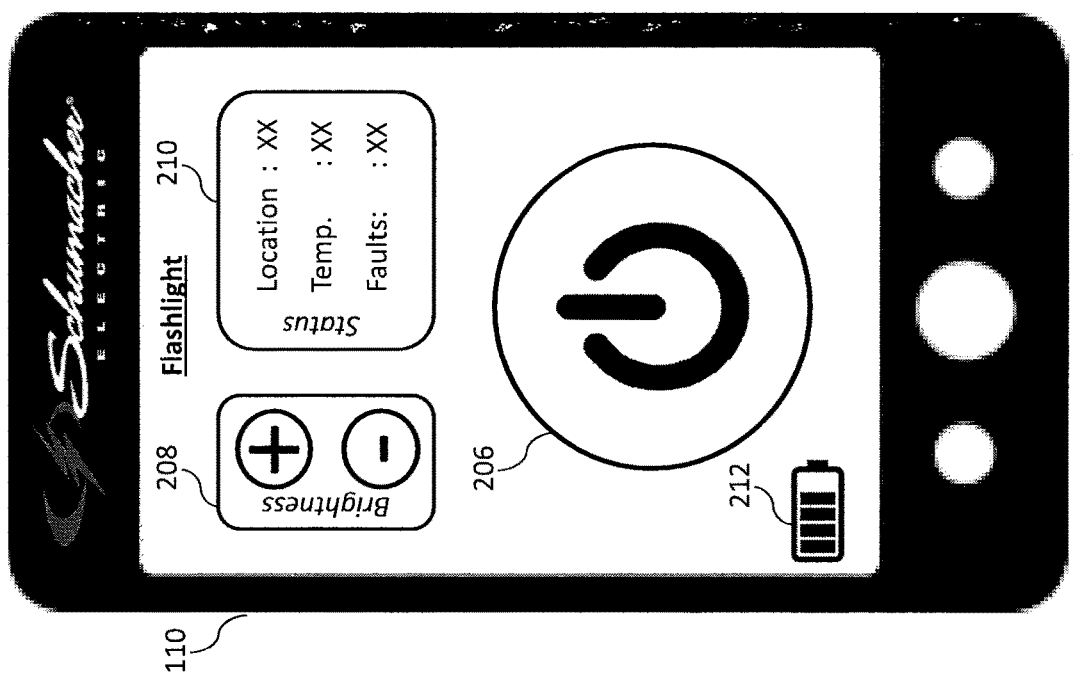

FIG. 2a illustrates a flashlight network 200 having a flashlight 100 and an external communication device 110, which may be used to monitor and/or control the flashlight 100. As illustrated, the flashlight 100 may communicate directly with the external communication device 110 in a point-to-point arrangement (e.g., using Bluetooth, Wi-Fi, etc.). In another example, the flashlight 100 may communicate with the external communication device via a communication network 202 (e.g., over a cellular network). In yet another example, the flashlight 100 may communicate with the external communication device via a relay device 204 (e.g., a Wi-Fi router) coupled to the communication network 202 (e.g., the Internet). For example, as illustrated in FIG. 2b, the external communication device 110 may display a control screen to enable the user to turn the flashlight on/off (e.g., via power icon 206) and/or adjust the brightness (via brightness icon 208) of the light source 104. The user may also monitor the SoC of the battery 122 via the battery charge icon 212 (which may also be used to indicate whether the battery is currently charging), as well as other status information (e.g., brightness of the light, location of the flashlight, temperature of the flashlight, temperature of the area surrounding the flashlight, temperature of the light generated by the flashlight, status/faults, etc.) via the status window 210.

Figure 3D:
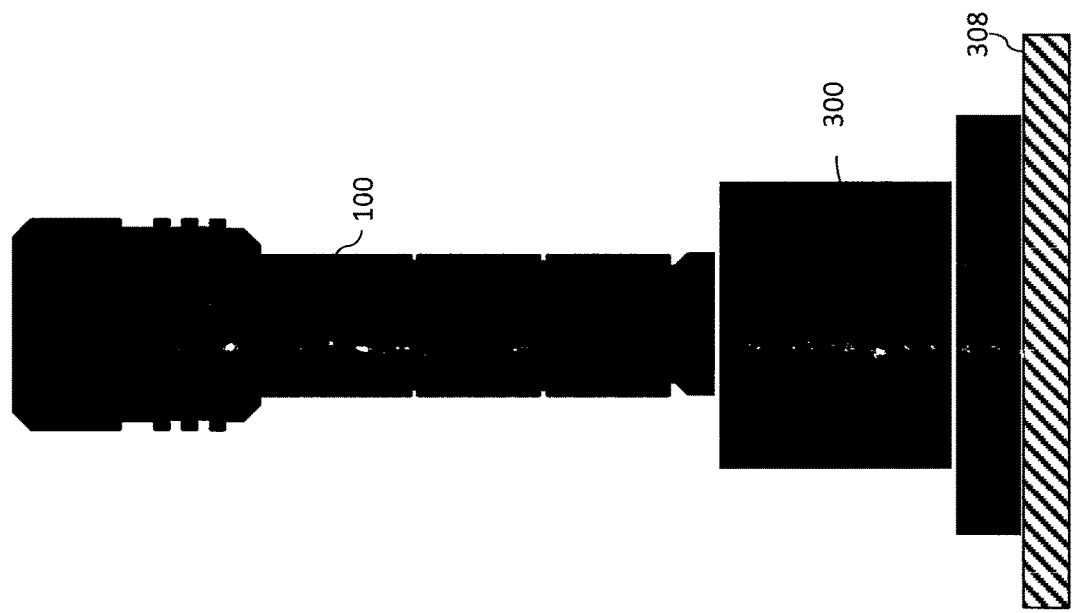

FIG. 3a through 3d illustrate a cross sectional view of a flashlight 100 (e.g., perpendicular to the longitudinal length of the flashlight—at the housing/handle) and an example wireless charging station 300. Specifically, FIG. 3a illustrates the wireless charging station 300 in an unloaded (empty) condition and Figured 3b illustrates the wireless charging station 300 in a loaded (charging) arrangement. As illustrated, the wireless charging station 300 generally comprises a base 302 defining a cavity 310 to receive a portion of the flashlight 100, a securing system 304 to secure the flashlight 100 within the cavity 310 (e.g., secured toward the base 302 in direction A), and a wireless transmitter 116 positioned in the cavity 310 (or on a surface of the cavity 310) proximate to the wireless receiver circuit 156, thereby inductively coupling the wireless transmitter 116 with the wireless receiver circuit 156 (e.g., via the receiver coil 158). Once the flashlight 100 is loaded (e.g., pressed or otherwise secured) into the cavity 310 of the base 302, the securing system 304 may hold the flashlight 100 by closing a pair of latches around the flashlight 100; this closed state is illustrated in FIG. 3b. Upon placing the flashlight 100 in the wireless charging station 300, the wireless charging station 300 may automatically start charging the flashlight's 100 internal battery 122 and/or auxiliary battery 166. For example, the wireless charging station 300 may be configured to detect the presence of the flashlight 100 by monitoring the load (e.g., detecting the presence of the battery) on the transmitter coil of the wireless transmitter 116 or by exchanging data using, for example, NFC.

Figure 3C:
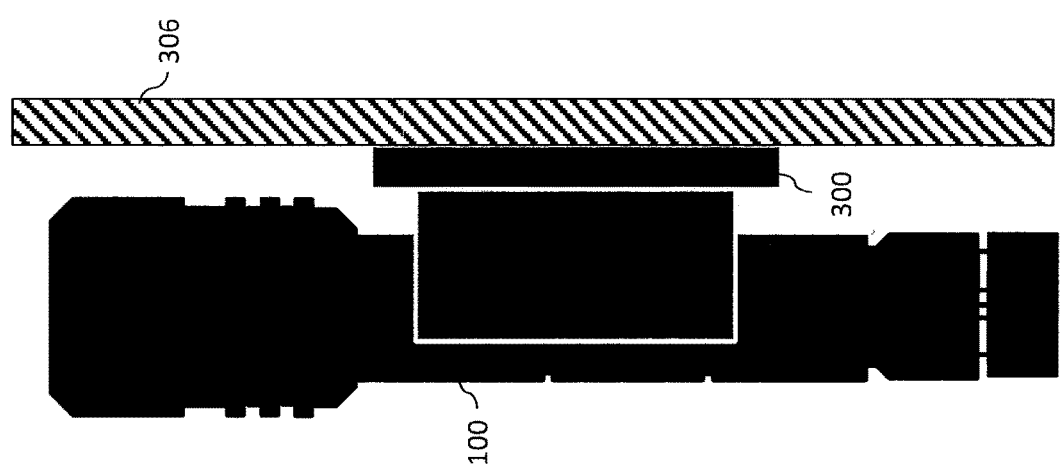

With reference to FIGS. 3c and 3d, a wireless charging station 300 may be mounted to a vertical surface 306 (e.g., a wall, cabinet, vehicle, etc.), or configured to simply rest (or secure to) on a horizontal surface 308 (in which case the securing system 304 can be omitted). The wireless charging station 300 may secure the flashlight 100 by either its handle (illustrated at FIG. 3c) or by an end (e.g., its proximal end as illustrated at FIG. 3d).

When the flashlight 100 is configured to mount to a surface, whether a vertical surface 306 or a horizontal surface 308, the light-end assembly of the flashlight 100 may be interchanged as will be discussed below to serve as first type of light when docked and a second type of light when not docked. For example, when mounted to a horizontal surface 308, the flashlight 100 may serve as a table-top lamp (e.g., a desk lamp, night stand lamp, etc.) when charging and, when a portable flashlight is desired, the flashlight 100 may be removed from the dock for hand-use by the operator (the light-end assembly may further be interchanged, where desired). Because the flashlight 100 uses an internal battery, the flashlight 100 may be used as a table lamp when line power is lost.

Figure 4:
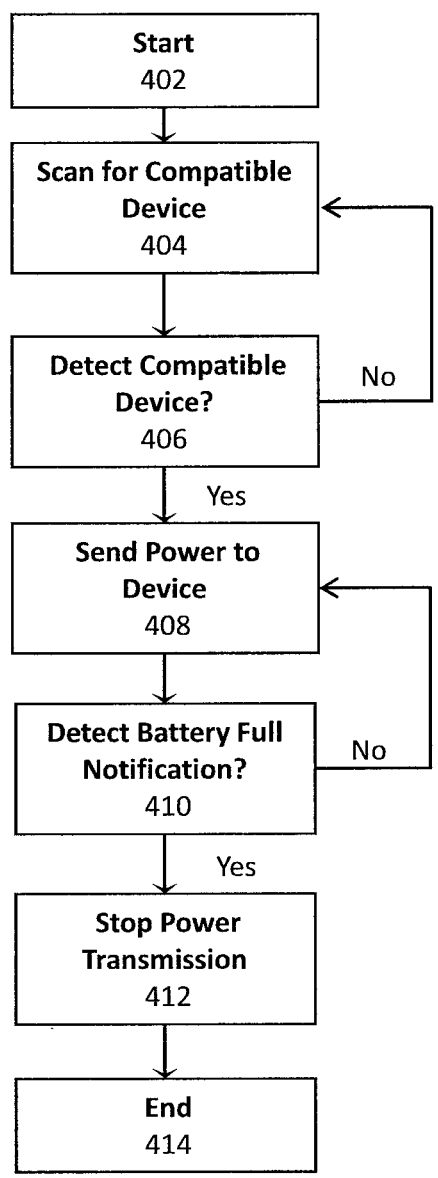
FIG. 4 illustrates a flow diagram depicting an exemplary wireless charging protocol.

FIG. 4 illustrates a flow diagram 400 for an exemplary wireless transmitter 116 protocol for use with a flashlight 100. Upon starting at step 402, the wireless transmitter 116 monitors for a compatible flashlight at step 404. If the wireless transmitter 116 detects a compatible device at step 406, the wireless charging source may then send power to the device at step 408. If the wireless transmitter 116 does not detect (or no longer detects) a compatible device at step 406, the wireless transmitter 116 reverts back to scanning for a compatible device at step 404. When a compatible device is detected and the wireless transmitter 116 is sending power to the device at step 408, the wireless transmitter 116 may obtain the battery charge level from the battery 122 directly or from the processor 102. If the wireless transmitter 116 detects a "battery full notification" at step 410, then the wireless transmitter 116 stop power transmissions at step 412 and the process ends at step 414, otherwise the wireless charging source reverts back to sending power to the device at step 408. The battery full notification (or another notification) may also be communicated wirelessly to the external communication device 110.

Figure 5:
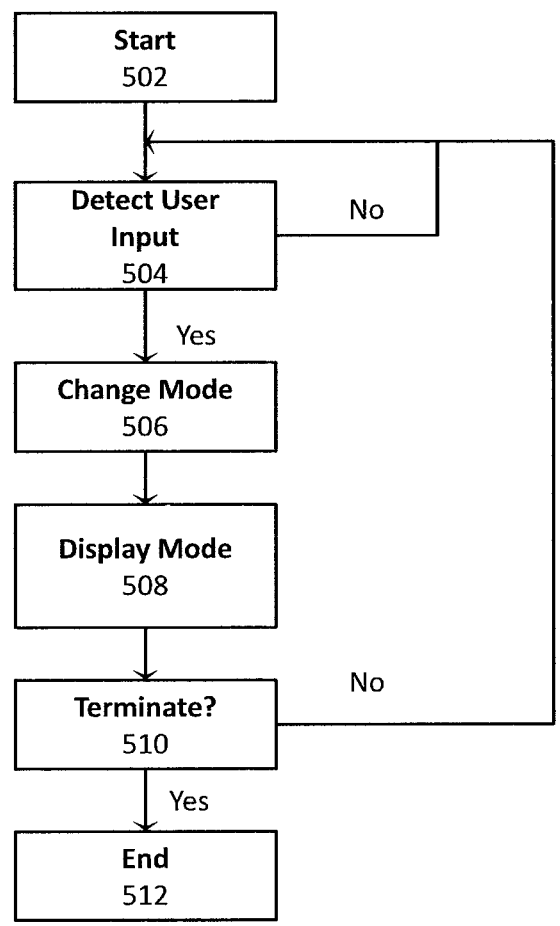
FIG. 5 illustrates a flow diagram depicting an exemplary mode selection protocol.

FIG. 5 illustrates a flow diagram depicting an example mode selection protocol 500 for use with a flashlight 100 system. Upon starting at step 502, the processor 102 waits to detect a user input at step 504, such as a button press or mode selection made from an external communication device 110. If no user input is detected at step 504, then the flashlight 100 enters a loop and continuously waits for an input. Once an input is detected at step 504, the processor 102 will update the desired mode in accordance with the desired input selection. Upon the processor 102 changing the mode at step 506, the processor 102 may then display the mode selection to the display device 142 at step 508. Unless the process is terminated at step 510, the processor 102 will return to step 504 until another user input is detected. If process is terminated at step 510, the process ends at step 512.

FIG. 6a illustrates an example modular flashlight 600. As illustrated, the modular flashlight 600 generally comprises a housing 602, a light-end assembly 604, and a base-end assembly 606. The housing 602 may be sized and shaped to serve as a handle for the user to grasp and/or hold; however, other shapes and sizes are contemplated. For example, the housing 602 may be shaped like a lantern base, puck, etc. The light-end assembly 604 generally comprises the light source 104 (e.g., LEDs, or other lighting element, such as lighting elements 710), while the base-end assembly 606 may provide a physical attachment device and/or external devices 160. Where desired, either or both of the light-end assembly 604 and the base-end assembly 606 may be removably coupled with the housing 602 via one or more detachable connectors 608. As illustrated, the housing 602 may comprise a first end (e.g., a proximal end) and a second end (e.g., a proximal end) that is opposed the first end (e.g., facing in opposed directions). A first detachable connectors 608 may be positioned at a first end to secure a light-end assembly 604, while a second detachable connectors 608 may be positioned at a second end to secure a base-end assembly 606.

The detachable connectors 608 may be configured to facilitate physical and/or electrical connection. The cross-sectional shape of the housing 602 may be round, square, or another desired geometric shape. For example, the housing 602 may comprise a flat side to serve as a base to prevent or mitigate rolling. The housing 602 may be hollow to accommodate circuitry and other components of the flashlight 100. For hand-held applications, the housing 602 may be about 2 to 18 inches in length, more preferably about 4 to 12 inches, most preferable about 6 to 8 inches in length, while the diameter may be between about ½ to 3 inches, more preferably about ½ to 2.5 inches, most preferable about 1 to 2 inches. The detachable connectors 608 may be configured to allow the light-end assembly 604 to rotate relative the housing 602 about the longitudinal axis of the flashlight 100 while maintaining operational contact (e.g., electrical contact) between the light-end assembly 604 and components within the housing 602. For example, the female component 608a may be configured to rotate relative to the male component 608b while maintaining electrical contact.

FIGS. 6b through 6d illustrate example detachable connectors 608 that may be incorporated in the flashlight 100. As illustrated, each of the detachable connectors 608 generally comprises a female component 608a and a male component 608b and a set of electrical contacts 612, 614. The female component 608a may be integrated with the housing 602, while the male component 608b may be integrated with either the light-end assembly 604 or the base-end assembly 606. The opposite, however, is possible where the male component 608b may be integrated with the housing 602, while the female component 608a may be integrated with either the light-end assembly 604 or the base-end assembly 606. In operation, the set of electrical contacts 612, 614 can be used to provide the positive electrical path of the circuit, while the flashlight's 100 housing (when made of metal) can function as the return/neutral electrical path of the circuit. Where the flashlight's 100 housing is not conductive, an additional set of electrical contacts may be provided to serve as the return/neutral electrical path of the circuit. FIG. 6b illustrates a detachable connector 608 with a spring-tension quick disconnectors 610 having a set of electrical contacts 612, 614 to electrically couple the female component 608a to the male component 608b. Specifically, the female component 608a may include an electrical contact 612 sized and shaped to receive an electrical contact 612 (e.g., a wire, or pin) positioned on the male component 608b. FIG. 6c illustrates a detachable connector 608 where each of the female component 608a and the male component 608b includes a magnet 620 and an electrical contact 614 biased by a spring 616. The magnet 620 may be, for example, an earth metal magnet (e.g., a neodymium magnet) or an electromagnet that draws its power from the battery 122. FIG. 6d illustrates a detachable connector 608 where the male component 608b includes a plurality of grooves 618 (e.g., threads) configured to mate (screw) with corresponding grooves (e.g., threads) on the female component 608a. Each of the female component 608a and the male component 608b may include an electrical contact 614 biased by a spring 616.

FIGS. 7a through 7e illustrate exemplary detachable light-end assembly 604 for use with a flashlight 100 system. The flashlight 100 may allow the attachment and detachment of various light-end assemblies 604 depending on the user/lighting needs to supplement the functionality of the flashlight 100.

Figure 7E:
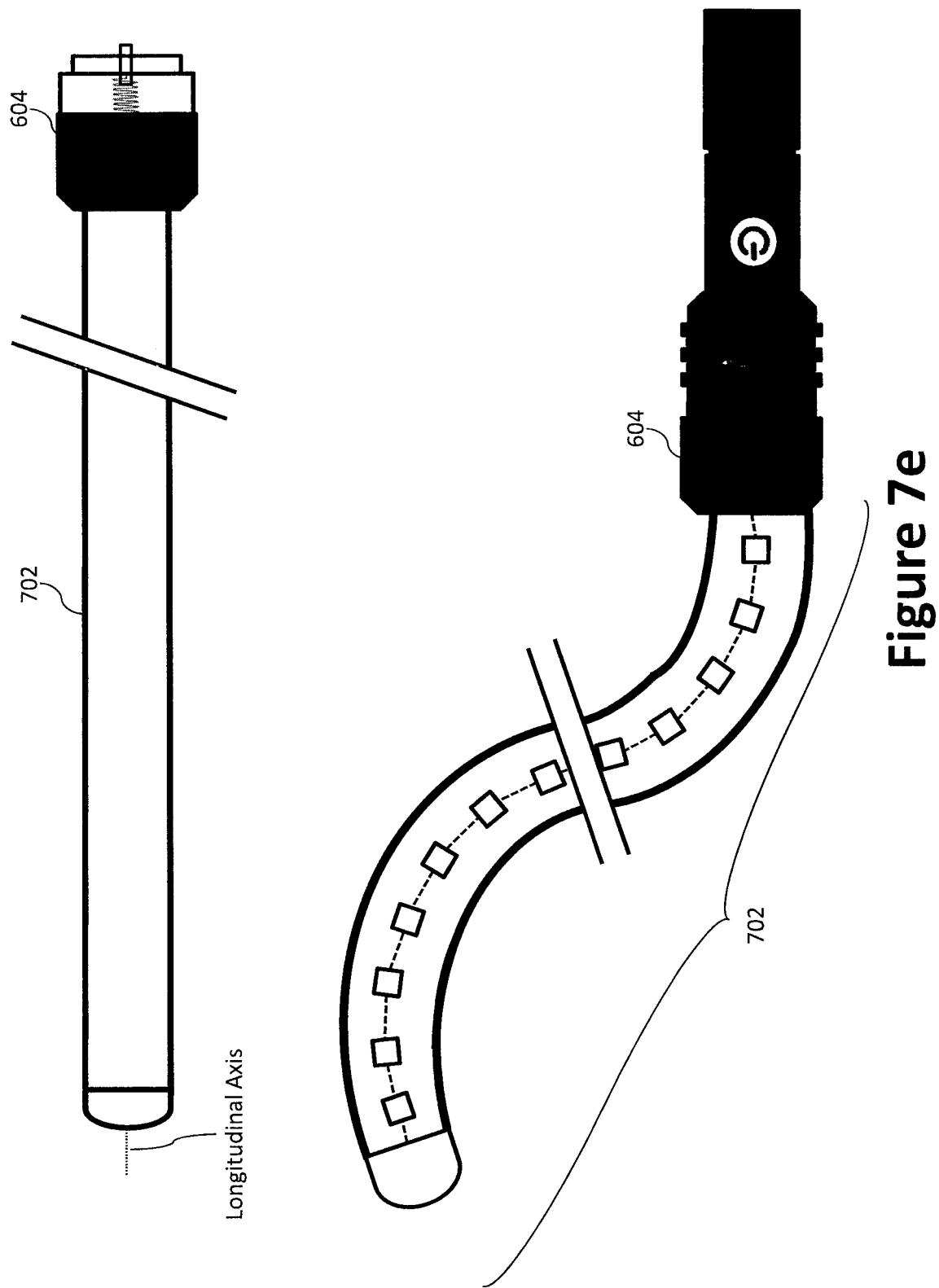

The light-end assembly 604 may employ a worklight light source 704 as illustrated in FIG. 7a. The worklight light source 704 may be a generally rigid housing 706 shaped as a linear shaft with a strip of lighting elements 710 (e.g., LEDs) positioned on along the length of at least one surface of the generally rigid housing 706, though two or more sides of the rigid housing 706 may comprise lighting elements 710. A transparent (e.g., clear, tinted, colored) or opaque lens may be provided over the strip of lighting elements 710 to seal them within the rigid housing 706, thereby providing protection from external elements (e.g., dirt, water, etc.). In certain aspects, the lens and rigid housing 706 may be fabricated as a single structure. The generally rigid housing 706 may be pivotally attached to the light-end assembly 604 via a pivot 708. The pivot 708 may be a hinge (to provide one degree of freedom as indicated by Arrow A) or a ball-and-socket joint (to provide multiple degrees of freedom). In other aspects, the light-end assembly 604 may also employ a narrow beam housing 712 (FIG. 7b), a wide beam housing 714 (FIG. 7c), or a lantern housing 716 (FIG. 7d), each with a transparent or opaque lens, reflector, etc. In certain aspects, the housing may be adjustable such that the light beam may be adjusted between a narrow beam and wide beam by twisting the end of the flashlight, which in turn would adjust one or more lens to focus the light beam. Finally, as illustrated in FIG. 7e, the light-end assembly 604 may employ a flexible light component 702 with a strip of lighting elements 710 (e.g., LEDs) positioned along the length of the flexible light component 702 (e.g., distributed along the length of the flexible light component 702). For example, the lighting elements 710 may be positioned on a surface of the flexible light component 702 or embedded in the flexible light component 702. As illustrated in FIG. 7e, the flexible light component 702 may be a flexible linear shaft that can be bent by the user to assume and hold a desired position. For example, the flexible light component 702 may be wrapped around a structure or shaped to fit into a desired space.

Figure 8A:
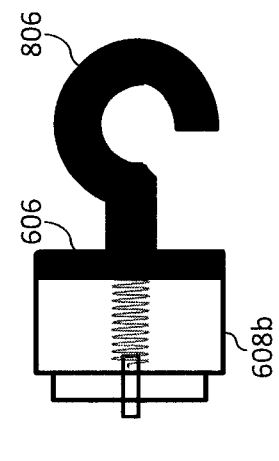
Figure 8B:
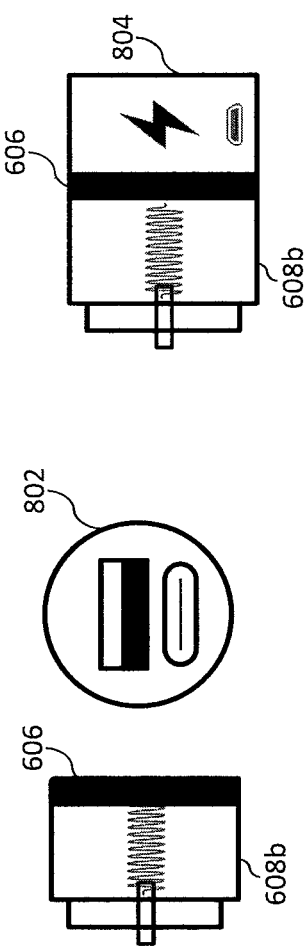

FIGS. 8a through 8j illustrate exemplary detachable base-end assembly 606 for use with a flashlight 100 system. The flashlight 100 may allow the attachment and detachment of various base-end assemblies 606 to supplement the functionality of the flashlight 100. As illustrated in FIG. 8a, the base-end assembly 606 may include a USB power adapter 802 to supply power between the battery 122 and another device via the USB power adapter 802. In use, an external device (e.g., a cellular phone, tablet, or other portable electronic) may be coupled to the USB power adapter 802 to receive a charging current from the battery 122 to charge the external device. In another example, an external DC supply (e.g., another battery, power bank, or AC/DC adapter) may be coupled to the USB power adapter 802 to charge the battery 122 and/or power the flashlight 100. In lieu of a USB power adapter 802, an EC5 port may be used to carry higher currents to facilitate jump starting functionality. As illustrated in FIG. 8b, the base-end assembly 606 may comprise an auxiliary battery assembly 804 to house an auxiliary battery 166 capable of powering the flashlight 100 and/or charging the inner battery 122 when the inner battery 122 is depleted. The auxiliary battery assembly 804 may include an integrated DC charging port (e.g., a USB port, barrel port, etc.) to charge the auxiliary battery 166 from a DC power supply when detached from, or otherwise separated from, the remainder of the flashlight 100 (e.g., the housing 602).

Figure 8C:
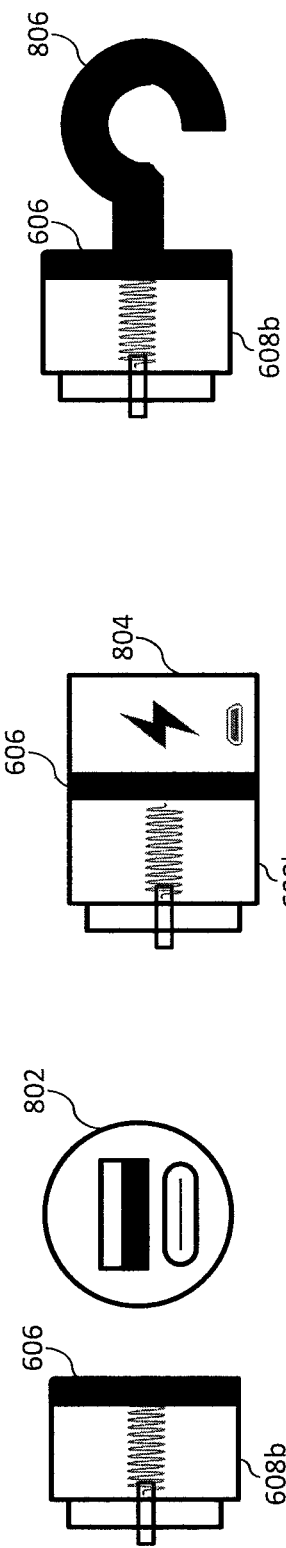
Figure 8D:
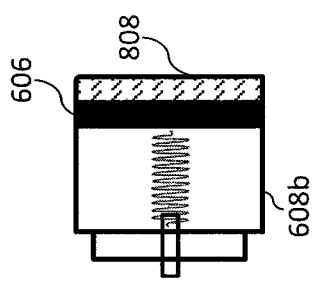

As illustrated in FIG. 8c, the base-end assembly 606 may have a hook 806 to allow the flashlight 100 to be hung from by the base-end, thereby providing hands-free use of the flashlight 100. The hook 806 may be flexible to allow it to fit around irregularly shaped objects. As illustrated in FIG. 8d, the base-end assembly 606 may also be configured with a magnet 808, which would allow the flashlight 100 system to attach magnetically to metal or other ferrous/magnetic surfaces. The magnet 808 may be an earth metal magnet (e.g., a neodymium magnet) or an electromagnet that draws its power from the battery 122, which may be engaged and disengaged by an external communication device 110 or user interface(s) 138.

Figure 8E:
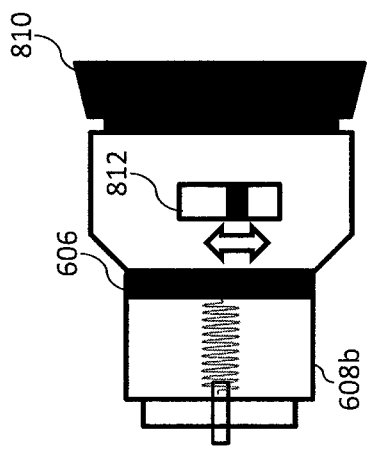
Figure 8F:
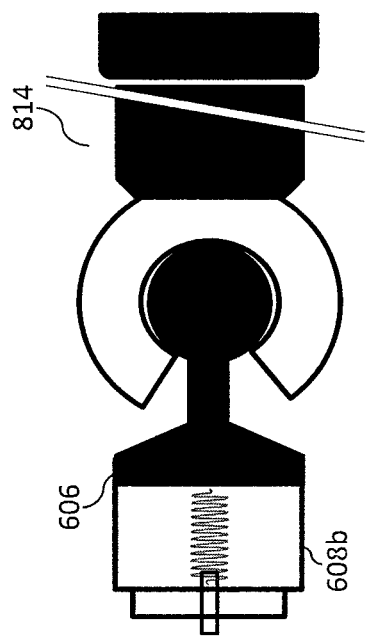

As illustrated in FIG. 8e, the base-end assembly 606 may incorporate a suction cup module 810, which allows the flashlight 100 to be mounted to a smooth surface through the use of vacuum forces (e.g., suction). The suction cup module 810 may include a switch or lever 812 that engages and disengages the suction cup to allow easy mounting and removal. Alternatively, a passive suction cup. As illustrated in FIG. 8f, the base-end assembly 606 may include a swiveling (e.g., pivots and/or rotates) connection via a swivel joint and/or telescoping handle 814 to allow the user to illuminate places that are out of reach.

As illustrated in FIG. 8g, the flashlight 100 may include a spring tension clamp 816 that allows the flashlight 100 to be secured on various surfaces or edges (e.g., the edge if a workbench). As illustrated in FIG. 8h, the base-end assembly 606 may include a base structure 818 to support one or more housings 602 in an upright and/or angled position. For example a plurality of housings 602 may be secured to the base-end assembly 606 to provide multiple light sources, which may be independently controlled and/or articulated.

As illustrated in FIG. 8i, the flashlight 100 may include a tail attachment 820 that allows the flashlight 100 to be secured to various surfaces by wrapping the tail attachment 820 around an object 826. The tail attachment 820 may be coated (e.g., with flexible material, such as rubber or plastic) and may employ a flexible, semi-rigid core or a spring-metal core (e.g., the spring-metal core automatically coils or wraps) to retain a desired shape or position.

As illustrated in FIG. 8j, the flashlight 100 may include a mouthpiece 822 (a bitable stem portion) that allows the flashlight 100 to be held comfortably in the user's mouth. The mouthpiece 822 may be fabricated from, or overmolded/coated with, a soft material that can be comfortably secured or held by the user's teeth. Example soft materials may include, for example, rubber (including hard rubber, such as vulcanized rubber), plastic, vinyl (e.g., dental vinyl), etc. When not in used, a cap 824 may be positioned over the mouthpiece 822 to prevent contamination from germs, dirt, etc. The cap 824 may be, for example, threadedly coupled to the flashlight 100 (e.g., housing 602 or base-end assembly 606) over the mouthpiece 822. The flashlight 100 may include any other attachment, which adds functionality (e.g., water floatation device, tripod, solar charging station, hand-crank charging station, etc.).

While the light-end assemblies 604 of FIGS. 7a through 7e and the base-end assemblies 606 of FIGS. 8a through 8j are generally described in connection with a modular/detachable design, the light-end assembly 604 and the base-end assembly 606 may be permanently coupled and/or integral with the housing 602.

FIGS. 9a and 9b illustrate a flashlight 100 (e.g., a flexible flashlight) having a housing 602 and a flexible light component 702 coupled at its proximal end to the housing 602. As noted above, the flexible light component 702 may be fixedly coupled to the housing 602 or removably coupled (e.g., via a detachable connector 608). As illustrated, the flexible light component 702 may include a flexible housing 902, a directed light lens 904, a flexible, semi-rigid structure 906, and a plurality of lighting elements 710. The region of the flexible light component 702 between its proximal and distal ends may be flexed in any direction relative to the housing 602, thereby enabling the user to aim the directed light lens 904 at a targeted area and/or bend the flexible light component 702 into a desired shape. The directed light lens 904 may include one or more lenses configured to adjust the width or diameter of the beam generated by the directed light lens 904. For example, the user may twist the directed light lens 904 to adjust the beam size.

Each of the lighting elements 710 may be employ one or more LEDs (e.g., surface mounted LEDs 908 and/or separate LED packages 910) to produce white light, whether using three individual LEDs that emit three primary colors (i.e., red, green, and blue) or by coating the LEDs with a phosphor material. In certain aspects, the one or more of the LEDs may be RGB LEDs to create light in multiple different shades of color by selectively illuminating the LEDs to mix the colors. In certain aspects, one or more of the lighting elements 710 may be an ultraviolet (UV) light element (e.g., a UV LED) to track ultraviolet reactive fluids. For example, a UV LED may be positioned behind the directed light lens 904. The lighting elements 710 may be provided as surface mounted LEDs 908, separate LED packages 910, or as a conventional LED housed in an epoxy lens/case. For example, a plurality of surface mounted LEDs 908 may be mounted to a flexible printed circuit board (PCB) that may be continuous to span the length of the flexible housing 902 or, as illustrated in FIG. 9a, cut into segments, each being electrically coupled in a daisy chain arrangement via electrical leads. Specifically, the configuration in FIG. 9a allows for more flexibility in the y-direction by alternating at least one strip of flexible printed circuit board with at least one void that contains the electrical leads (e.g., wires, ribbon cable, etc.) to electrically couple each portion of flexible printed circuit board to the next. Alternatively, as illustrated in FIG. 9b, a plurality of separate LED packages 910 may be electrically coupled to each other via electrical leads. Each separate LED package 910 may include, for example, an LED chip (such as chip-on-board (COB) LED, which may be optionally coated with phosphor) affixed to a silicon sub-mount, which can then be coupled to a thermal heatsink. Each LED package 910 may be positioned in (or on) an outer package to improve structural integrity of the LED package 910, which may further include a lens to guide light emitted by the LED chip. The LED package 910 may be secured within the flexible housing 902 via the outer package.

The flexible housing 902 may be generally cylindrical with a diameter between ⅛ inch and 1 inch, more preferably between about ¼ inch and ¾ inches, and most preferably about ½ inch. The flexible housing 902 may be about 2 to 24 inches in length, more preferably about 6 to 18 inches, most preferable about 12 inches in length. The flexible housing 902 may be coupled at its proximal end to the light-end assembly 604, while the directed light lens 904 may be coupled to the distal end of the flexible housing 902. While the directed light lens 904 and the flexible housing 902 are illustrated as separate components, they may be fabricated as a single component. The flexible housing 902 may be fabricated from one or more flexible transparent (or semi-transparent) materials, including, for example, silicone, polyvinyl chloride (PVC), polycarbonate, ethylene vinyl acetate (EVA) copolymer, etc. The flexible housing 902 may be configured to fully enclose and/or seal any enclosed electronics (e.g., the lighting elements 710 and any associated electrical components) to provide protection from dust, shock, and water.

The flexible housing 902 may be fabricated from one or more materials to provide a desired light brightness, color, and/or distribution. To that end, the flexible housing 902, or portions thereof, may be a clear material, an opaque material to function as a diffusor, or a transparent colored (or tinted) material to tint the light, filter the light, and/or provide UV light. An opaque material may prove advantageous where, for example, an even "soft glow," while a clear material may be preferred when a used desired a bright light. In certain aspects, the flexible housing 902 may be segmented and/or fabricated from a plurality of materials, such as a clear material, an opaque material, transparent colored material, etc. Indeed, as best illustrated in FIGS. 9c through 9e that illustrate example configurations taken at cross-section A-A of FIG. 9b, the flexible housing 902 may be divided lengthwise into two or more segments. For example, the flexible housing 902 may be divided into two segments 910a, 910b as illustrated in FIG. 9c, three segments 910a, 910b, 910c as illustrated in 9d, or four segments 910a, 910b, 910c, 910d as illustrated in 9e. While FIGS. 9c through 9e illustrate the flexible housing 902 as having a circular cross-section, other shapes are contemplated, including a flatter rectangular cross-section and an oval cross-section as illustrated in FIGS. 9f and 9g. A benefit of a flatter cross-section is that the flexible housing 902 may be more easily rolled upon itself for storage (e.g., wrapped or coiled).

Each of the segments may be fabricated from the same material, different materials, or even as a single structure such that light is directed in a particular direction or a different form of light is emitted depending on which strip (or array) of lighting elements 710 is illuminated. The flexible, semi-rigid structure 906 may be embedded within the flexible housing 902 to allow the flexible housing 902 to maintain its shape. The flexible, semi-rigid structure 906 may be, for example, a semi-rigid wire fabricated from metal or a metal alloy (e.g., aluminum, iron, and alloys thereof) to hold or maintain the shape of the flexible housing 902 once bent by a user.

The flexible housing 902 includes a plurality of lighting elements 710 positioned along the length of the flexible housing 902 between its proximal and distal ends. For example, the plurality of lighting elements 710 may be embedded throughout the length of the flexible housing 902 to generated light along the length of the flexible housing 902. In certain aspect, the plurality of lighting elements 710 may be configured to point in different directions to generate light around the 360 degree diameter of the flexible housing 902. For example, with reference to FIG. 9d, two strips of lighting elements 710 may be positioned facing in opposite directions, where each strip of lighting elements 710 generates lights about 180 degrees of the flexible housing's 902 diameter (e.g., each side of the dotted line). In another example, with reference to FIG. 9d, three strips of lighting elements 710 may be positioned facing different directions, where each strip of lighting elements 710 generates light about at least 120 degrees of the flexible housing's 902 diameter. In yet another example, with reference to FIG. 9e, four strips of lighting elements 710 may be positioned facing different directions, where each strip of lighting elements 710 generates light about at least 90 degrees of the flexible housing's 902 diameter. Similarly, the directed light lens 904 may include one or more lighting elements 710 to illuminate a targeted area (e.g., to function as a spotlight).

The flashlight 100 may comprise a plurality of LEDs or LED arrays, each of which may be independently activated/deactivated to yield a desired light profile. Further, each of the plurality of LEDs or LED arrays may be independently dimmed (e.g., by adjusting a PWM driver to a given LED or LED array) to yield a desired light brightness or intensity.

The independently controlled LEDs and/or LED arrays may be positioned on different portions of the flashlight 100 (e.g., at segments 910a, 910b, 910c, 910d). For example, the lighting elements 710 associated with each segment of the flashlight 100 may be selectively activated (or deactivated) to provide a desired amount of light around and outward (radially) from an axis defined by the longitudinal axis (X-axis) of the flexible housing 902.

Figure 12B:
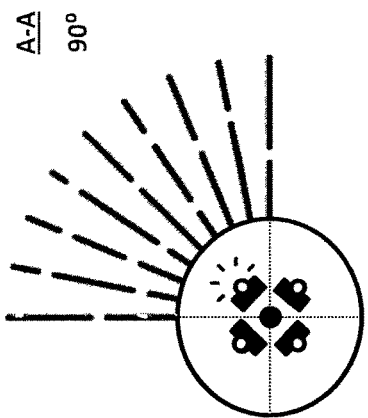
FIGS. 12a through 12e illustrate an example lighting arrangement for providing light incrementally from 0 degrees to 360 degrees about a longitudinal axis.
Figure 12A:
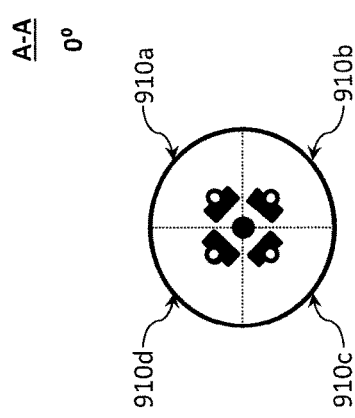
Figure 12E:
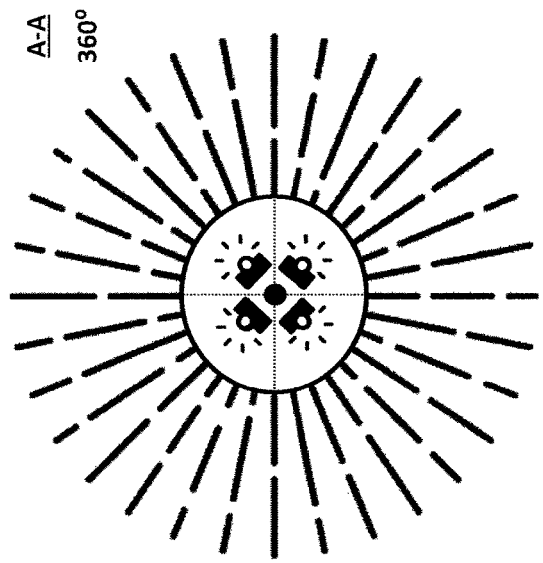
Figure 12D:
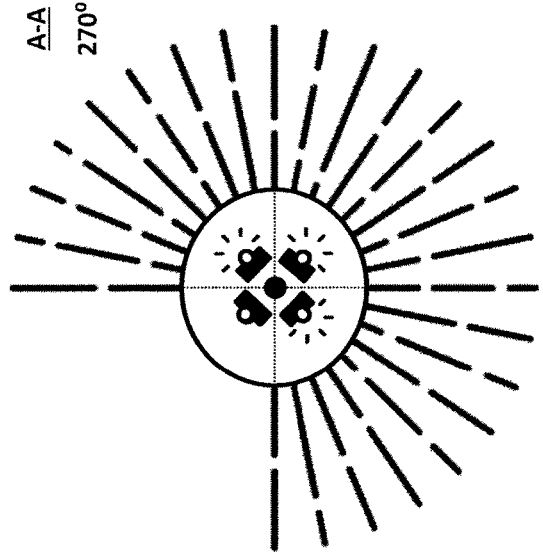
Figure 12C:
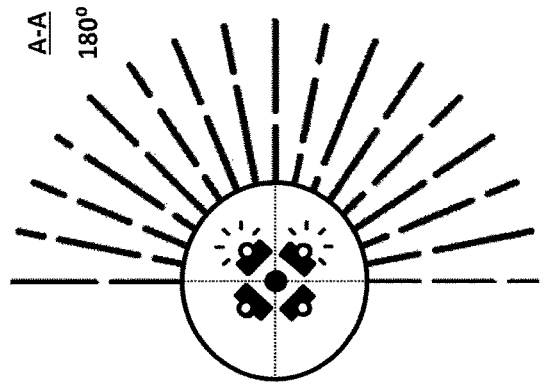

FIGS. 12a through 12e, which uses the light of FIG. 9e as an example, demonstrates an example lighting arrangement for providing light incrementally from 0 degrees (FIG. 12a) to 360 degrees (FIG. 12e) of light about the longitudinal axis. In this example, the longitudinal axis coincides with the flexible, semi-rigid structure 906 positioned in the flexible housing 902. As illustrated in FIG. 12b, the lighting element(s) 710 of segment 910a may be activated to provide 90 degrees of light about the longitudinal axis. To provide an additional 90 degrees (totaling 180 degrees), the lighting elements 710 of segment 910b may be activated as illustrated in FIG. 12c. To provide an additional 90 degrees (totaling 270 degrees), the lighting elements 710 of segment 910c may be activated as illustrated in FIG. 12d. Finally, the lighting elements 710 of all four segments 910a, 910b, 910c, 910d are activated, thereby providing 360 degrees of light about the longitudinal axis as illustrated in FIG. 12e. While increments of 90 degrees are described, larger or smaller increments may be provided by adjusting the number of independently controlled LEDs or LED arrays positioned about the longitudinal axis.

A user interface (e.g., a knob or dial) may be provided on the flashlight 100 (e.g., at housing 602) to adjust the desired amount of light around the axis defined by the longitudinal axis. For example, when the user interface is positioned at a first extreme position (e.g., rotated all the way to the left) all lights may be deactivated as illustrated in FIG. 12a, while all lights may be activated when the user interface is positioned at a second extreme position (e.g., rotated all the way to the right) as illustrated in FIG. 12e. As the user adjusts (e.g., rotates) the user interface from the first extreme position to the second extreme position, the lighting elements 710 may activate incrementally (e.g., one LED or one LED array per increment) until all lighting elements 710 are activated as illustrated in FIGS. 12b through 12d. The knob or dial may be integrated with, for example, the housing or light head to enable a user to adjust the amount of light through a twisting motion of the housing, the light head, or a portion thereof. Alternatively or additionally, the flashlight 100 may be provided with a mechanical shutter to adjust the light profile by physically obstructing or blocking the lighting elements 710 (or a portion thereof). The mechanical shutter may likewise be adjusted through a twisting motion of the housing, the light head, or a portion thereof.

Figure 11D:
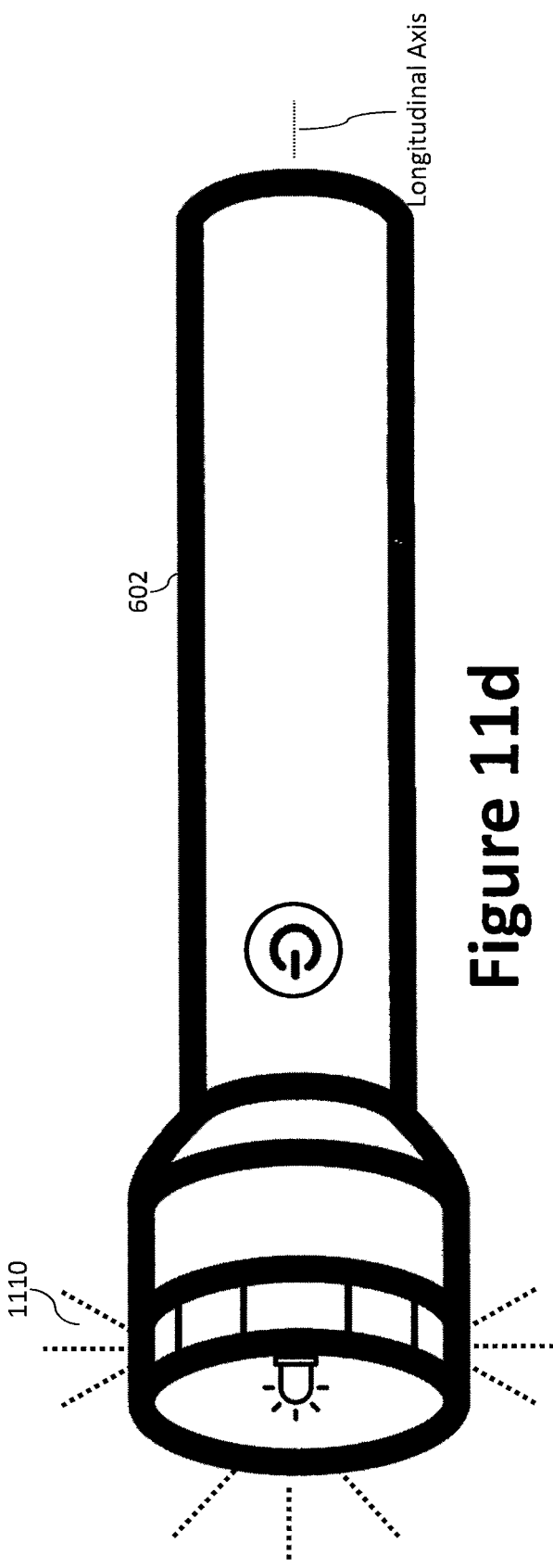
FIGS. 11d and 11e illustrate a flashlight having a 360-degree lighting element.
Figure 11E:
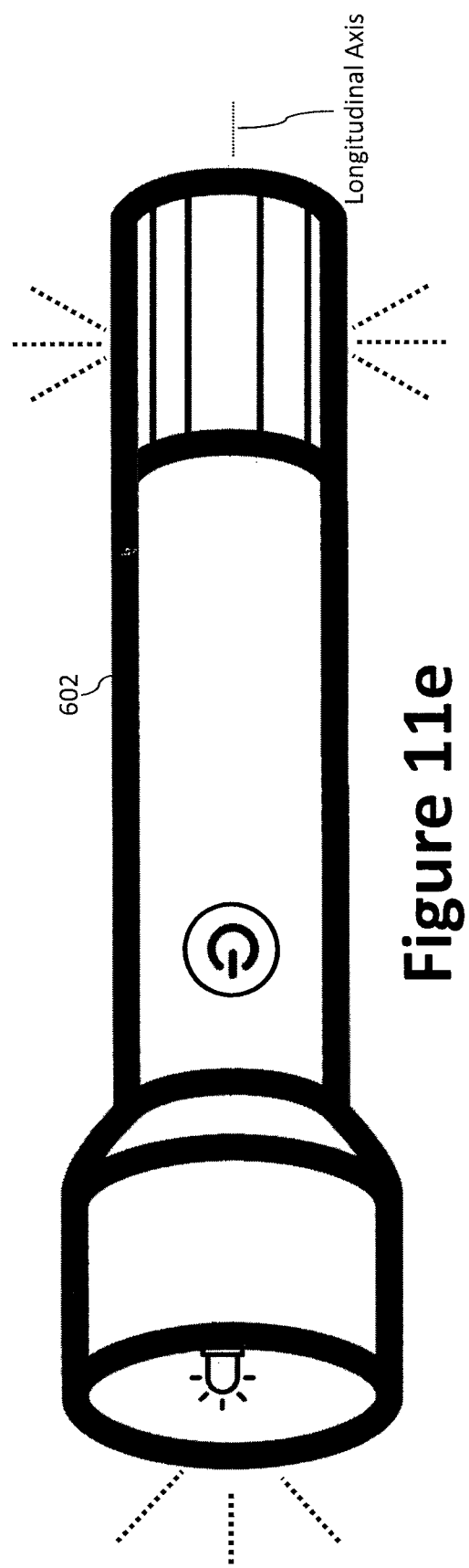

While described primarily in connection with a flexible housing 902 used in a flexible light component 702, the independently controllable lights and/or mechanical shutter may be similarly applied to other light configurations (e.g., the light-end assemblies 604 of FIGS. 7a through 7d) to provide a desired light profile. For example, FIGS. 11d and 11e illustrate example flashlights with LEDs positioned to provide between 0 and 360 degrees of light about the longitudinal axis, in addition to light directed in a forward direction. Specifically, as illustrated in FIG. 11d, a 360-degree lighting element 1110 may be provided at the first end of the flashlight (e.g., adjacent the forward-directed light) to provide 0 to 360 degrees of light about the longitudinal axis. The 360-degree lighting element 1110 may comprise a lens, diffuser, and/or a plurality of independently controlled LEDs or LED arrays. In other aspects, the 360-degree lighting element 1110 may be provided on the housing, an example of which is illustrated in FIG. 11e.

In certain aspects, a flexible light component 702 (or another light-end assembly light-end, such as those illustrated in FIGS. 7a through 7e) may be provided on each side of the housing 602. An example dual-light flashlight 100 is illustrated in FIG. 9h. As can be appreciated, the flexible light components 702 may be removably coupled or fixedly coupled (or a combination thereof) with each end of the housing 602. A directed light lens 904 including one or more lighting elements 710 may be position at the distal end of each flexible light component 702.

Figure 10:
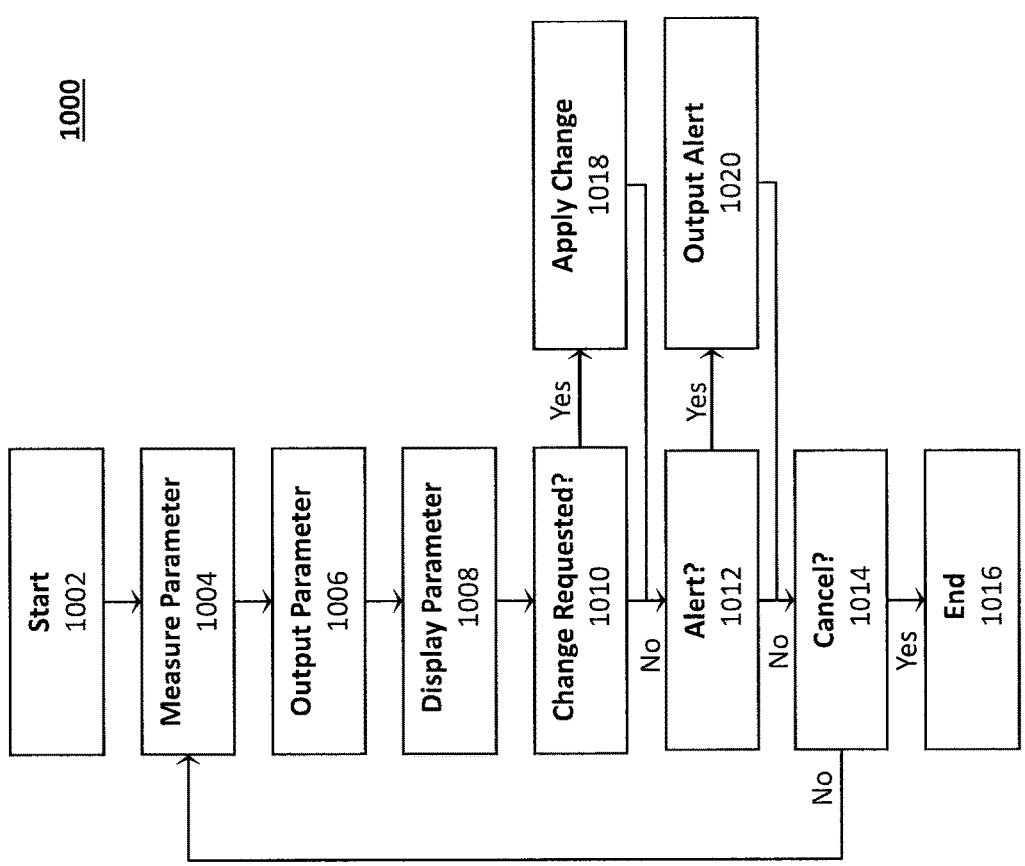
FIG. 10 illustrates a flow diagram depicting an example flashlight battery charging system protocol.

Turning to FIG. 10, a flow diagram is depicted of an example external battery charging protocol 1000. Started at step 1002, the battery charging protocol is initiated. At step 1004, a measure parameter of the flashlight 100 and/or battery 122 is determined. The flashlight 100 monitors various types of data (e.g., voltage, current, temperature), whereby the flashlight 100 calculates charge percent, battery health, system run time and other measurement parameters. Example measurement parameters include, for example, battery-charging faults (e.g., "NO FAULTS" or specific fault), battery-charge voltage (volts), battery voltage type, battery-charge current (amps), percent charge of battery, charge state type, actual charge time (minutes), battery temperature, temperature exceeded limit, AC power status (e.g., plugged in or disconnected), gateway radio signal strength, and ACM software version (broadcast on connection only).

As step 1006, the parameter is outputted to the external communication device 110 and displayed at step 1008. At step 1010, the user may provide one or more commands to the flashlight 100. For example, the user may include an application command, reset microcontroller (e.g., processor 102), reset nonvolatile memory after changing battery (e.g., ROM 146 or data storage device 150), host firmware revision, request a dropped message count, download checksum for file used for host user controlled software update, download firmware to external flash via ACM, request device code, product ID, and power mode, report of device code, product ID, and power mode, ACM connection status, and start or stop a given charge.

At step 1012, the flashlight 100 may alert the user to one or more potential issues. For example, an integrated speaker or display devices may output an alert (e.g., sound, visual, etc.) at step 1020 to indicate to the user that there may be an issue with the flashlight 100. Alternatively, the alert may be output to the external communication device 110 and displayed at step 1020. The process may be cancelled at step 1014, where, if cancelled, the process ends at step 1016. Alternatively, the process may return to step 1004 whereby the one or more parameters are updated (e.g., re-measured) and the cycle continues. The cycle may be repeated dynamically (e.g., in real time) or in periodic intervals (e.g., every 30 seconds to 5 minutes).

In operation, a user may wish to position the light in a small area, which may be difficult to reach due to the size of the flashlight 100 (e.g., its housing 602). Therefore, it may be desirable to detach the lighting component from the remainder of the flashlight 100 for a period of time. To that end, FIGS. 11a and 11b illustrate a flashlight 100 having a detachable light-end assembly 604 that remains powered when detached from the housing 602. The detachable light-end assembly 604 may be electrically and/or communicatively coupled with the components of the housing 602 (e.g., the battery 122) via a wired tether 1102. The wired tether 1102 may be configured to retract into the housing 602 when the detachable light-end assembly 604 is coupled to the housing 602. The detachable light-end assembly 604 may be physically coupled to the housing 602 via a pair of clips 1104a, 1104b.

Where a wired tether 1102 is not desired, the detachable light-end assembly 604 may be equipped with an onboard power supply. Using the example illustrated in FIG. 11b, an auxiliary battery 166 may be positioned in the detachable light-end assembly 604 to power its one or more lighting elements 710 when detached from the battery 122 and/or housing 602. To recharge the auxiliary battery 166, the detachable light-end assembly 604 may be coupled to the housing 602 to receive a charging power from the battery 122 and/or the charging circuit 120. In certain aspects, the detachable light-end assembly 604 may comprise its own DC port to facilitated charging of the auxiliary battery 166 via an integrated power converter and/or charging circuit.

When desired, logic circuitry (e.g., a processors, memory, etc.) may be positioned in or at the detachable light-end assembly 604 to facilitate control and operation of the one or more lighting elements 710 (or other components) when detached from the logic components of the housing 602. To reduce complexity of the detachable light-end assembly 604, the detachable light-end assembly 604 may be configured to employ a default mode, for example, to maintain the user-selectable predetermined mode (e.g., constant, flashing mode, an SOS mode, etc.) at the time the detachable light-end assembly 604 is detached from the housing 602. In other aspects, the detachable light-end assembly 604 may also be provided with a user interface to facilitate control and/or adjustment of the one or more lighting elements 710 without necessitating reconnection to the housing 602.

In another aspect, the desired electrical and lighting components of the flashlight 100 (e.g., the power supply module 132, light module 154, etc.) may be provided as a stand-alone compact light head 1106 to be positioned at the end of a flexible structure 1108 (which may be bent to provide a flexible hook, or other shape), an example of which is illustrated in FIG. 11c. To allow the user to insert or snake the compact light head 1106 into small areas or crevices, the compact light head 1106 may have a diameter of, for example ⅛ to 1 inch, more preferably about ⅜ inch. Similar to the above-described tail attachment 820, the flexible structure 1108 may be a semi-rigid, flexible linear rod (or wire, tube, etc.) that coated (e.g., with flexible material, such as rubber or plastic) and may employ a flexible, semi-rigid core or a spring-metal core (e.g., the spring-metal core automatically coils or wraps) to retain a desired shape or position. The length of the flexible structure 1108 may be determined based on its application. For example, the flexible structure 1108 may be relatively short (e.g., 3 to 8 inches) in automotive repair applications where many small-diameter objects exist about which the flexible structure 1108 may be wrapped. However, in other applications, such as construction, it may be desirable to wrap the flexible structure 1108 around a larger object, such as a drywall stud, column, or the like, in which case the flexible structure 1108 may be longer (e.g., over 8 inches, for example, 8 to 36 inches).

While the present disclosure has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:
1. A flexible flashlight comprising:
 a housing having a proximal end and a distal end, wherein the housing defines a hollow cavity to house a battery;
 a light-end assembly having a flexible light component and a plurality of light emitting diodes, wherein the light-end assembly is detachably coupled to the distal end of the housing via a first detachable connector, wherein the flexible light component has a proximal end and a distal end, the proximal end of the flexible light component being coupled with the light-end assembly, wherein the plurality of light emitting diodes (LEDs) distributed along the flexible light component between its proximal end and its distal end; and a base-end assembly coupled to the proximal end of the housing, wherein the base-end assembly is configured to couple detachably with the proximal end of the housing via a second detachable connector.

2. The flexible flashlight of claim 1, wherein the base-end assembly includes an auxiliary battery to charge the battery or power the flexible flashlight.

3. The flexible flashlight of claim 1, wherein the base-end assembly includes a hook or a magnet.

4. The flexible flashlight of claim 1, wherein the base-end assembly includes a swivel joint.

5. The flexible flashlight of claim 1, wherein the base-end assembly includes a clamp.

6. The flexible flashlight of claim 1, wherein the base-end assembly includes a USB power adapter to facilitate charging of an external device using the battery.

7. The flexible flashlight of claim 1, wherein the base-end assembly includes a tail attachment having (1) a flexible, semi-rigid core coated with flexible material or (2) a spring-metal core coated with flexible material.

8. The flexible flashlight of claim 1, wherein the plurality of light emitting diodes (LEDs) are arranged to direct light around and radially from an axis defined by the flexible light component.

9. The flexible flashlight of claim 8, further comprising a user interface positioned on an external surface of the housing, wherein the user interface is configured to adjust a desired amount of light around the axis by selectively activating one or more of the plurality of LED arrays positioned around the axis.

10. The flexible flashlight of claim 9, wherein the user interface has a first extreme position and a second extreme position, wherein each of the plurality of LED arrays is deactivated when the user interface is in the first extreme position and each of the plurality of LED arrays is activated when the user interface is in the second extreme position.

11. The flexible flashlight of claim 10, wherein the user interface is configured to activate or deactivate the plurality of LED arrays incrementally as an operator transitions the user interface between the first extreme position and the second extreme position.

12. The flexible flashlight of claim 8, wherein the flexible light component is configured to generate between 0 and 360 degrees of light about the axis.

13. The flexible flashlight of claim 9, wherein the user interface is a knob or dial.

14. The flexible flashlight of claim 8, further comprising a communication transceiver operatively coupled with the processor, wherein the communication module is configured to communicate commands or data wirelessly between the flexible flashlight and an external communication device.

15. The flexible flashlight of claim 8, further comprising a DC port to output power from the battery to power an external device.

16. The flexible flashlight of claim 15, wherein the DC port comprises a USB port.

17. The flexible flashlight of claim 16, wherein the USB port is configured to receive power to charge the battery.

18. The flashlight of claim 15, wherein the DC port is configured to output a jump starting current from the battery to jump start an engine of a vehicle.

19. The flexible flashlight of claim 9, further comprising a solar charging station configured to provide power to the battery.

20. The flexible flashlight of claim 9, further comprising a hand-crank charging station configured to provide power to the battery.

\* \* \* \* \*